(12) United States Patent
Sahle-Demessie et al.

(10) Patent No.: US 8,404,183 B2
(45) Date of Patent: Mar. 26, 2013

(54) PROCESS USING COMPACT EMBEDDED ELECTRON INDUCED OZONATION AND ACTIVATION OF NANOSTRUCTURED TITANIUM DIOXIDE PHOTOCATALYST FOR PHOTOCATALYTIC OXIDATION

(75) Inventors: Endalkachew Sahle-Demessie, Mason, OH (US); Pratim Biswas, Chesterfield, MO (US); Unnikrishnan R. Pillai, Cincinnati, OH (US); Chulhan Kim, Seoul (KR)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 627 days.

(21) Appl. No.: 12/544,771

(22) Filed: Aug. 20, 2009

(65) Prior Publication Data
US 2009/0301859 A1 Dec. 10, 2009

Related U.S. Application Data

(62) Division of application No. 11/412,940, filed on Apr. 28, 2006, now Pat. No. 7,691,342.

(51) Int. Cl.
*A61L 2/10* (2006.01)
(52) U.S. Cl. .............................. 422/22; 422/4

(58) Field of Classification Search ............. 422/4, 22
See application file for complete search history.

(56) References Cited

U.S. PATENT DOCUMENTS

| 4,960,570 | A | 10/1990 | Mechtersheimer ...... 422/186.21 |
|---|---|---|---|
| 5,855,856 | A | 1/1999 | Karlson ................... 422/186.11 |
| 5,955,038 | A | 9/1999 | Gaeow et al. ............ 422/186.07 |
| 6,039,816 | A * | 3/2000 | Morita et al. .................... 134/19 |
| 6,077,492 | A * | 6/2000 | Anpo et al. ................. 423/239.1 |
| 6,730,277 | B2 | 5/2004 | Lee et al. ................. 422/186.07 |
| 6,777,374 | B2 * | 8/2004 | Sahle-Demessie et al. .. 502/350 |
| 6,923,015 | B2 * | 8/2005 | Ueno et al. ....................... 62/264 |
| 7,382,087 | B2 | 6/2008 | Tabata et al. ................ 313/362.1 |
| 7,582,256 | B1 * | 9/2009 | Geron et al. ...................... 422/4 |
| 2004/0175318 | A1 * | 9/2004 | Segawa et al. ................ 423/247 |

* cited by examiner

*Primary Examiner* — Kishor Mayekar
(74) *Attorney, Agent, or Firm* — Bacon & Thomas, PLLC

(57) ABSTRACT

A reactor produces a surface corona for emitting UV light and for the production of ozone by passing air or oxygen through the surface corona. The emitted UV light activates a photocatalyst coated on a surface facing a surface with embedded electrodes which generate the surface corona. The photocatalyst is a thin film of nanoparticle $TiO_2$ with primary particle size of 0.02 to 0.2 μm was deposited on a substrate by a flame aerosol method. The method combines ozonation and photocatalysis to provide effective and efficient oxidation of alcohols and hydrocarbons to value added products. The method can also be used for air and water cleaning.

13 Claims, 27 Drawing Sheets

SEM image of the dioxide film x40,000

SEM image of the dioxide film x5000

PROCESS USING COMPACT EMBEDDED ELECTRON INDUCED OZONATION AND ACTIVATION OF NANOSTRUCTURED TITANIUM DIOXIDE PHOTOCATALYST FOR PHOTOCATALYTIC OXIDATION

CROSS REFERENCE TO RELATED APPLICATIONS

This application is a division of U.S. Ser. No. 11/412,940 filed Apr. 28, 2006, pending.

BACKGROUND OF THE INVENTION

1. Field of the Invention

The present invention relates to a surface corona reactor and to the use thereof. The reactor may be used for oxidative destruction of organic contaminants in air and water and for selective or complete oxidation of organic compounds in the gas and liquid phases in large scale industrial and environmental applications.

2. The Prior Art

Advanced oxidation technologies (AOTs) have been considered for treatment of contaminated water and air as an alternative to thermal destruction and adsorption methods. These are near ambient temperature processes utilizing the hydroxyl radical (.OH) as a primary oxidant. The generation of .OH radicals is commonly accelerated by ozone ($O_3$), hydrogen peroxide ($H_2O_2$), titanium dioxide ($TiO_2$), UV radiation, ultrasound, or high electron beam irradiation. Ozone is a reactive gas that has a low solubility in water. It is usually generated on-site from an oxygen source, such as dry air or pure oxygen, by high-voltage surface corona discharge, by ultraviolet radiation or by electrolytic and/or chemical reactions. Ozone is not only a powerful oxidizing agent but also a very powerful non-chemical disinfectant. Ozone has the unique feature of decomposing to a harmless, nontoxic, environmentally safe material, i.e., oxygen. Ozone is currently used for many purposes: taste and odor removal, turbidity reduction, organics removal, microflocculation and manganese oxidation, bacterial disinfections and viral inactivation. However, the ability of ozone to effectively treat wastewater is dependent on the nature of the contaminant. For example, ozone will readily remove color from a dye solution but has much more difficulty reducing the biochemical oxygen demand (BOD) of some organic streams. These differences in ozone effectiveness are due to the chemistry involved in the ozone induced oxidation process. Ozonation techniques, therefore, generally result in partial oxidation of organic pollutants. Other agents such as ultraviolet radiation, oxidants (ozone, hydrogen peroxide) and high pH in homogeneous systems or heterogeneous photocatalytic systems that combine near ultraviolet light (320 to 390 nm) and a light-activated catalyst, such as titanium dioxide, are also used.

Photocatalytic oxidation (PCO) is an alternative technology for cleaning air by removal of volatile organic compounds (VOCs). The technology uses a solid semiconductor photocatalyst—commonly titanium dioxide ($TiO_2$)—that, when illuminated with ultraviolet (UV) light, can promote oxidation of organics at room temperature. This same oxidation of VOCs would require high temperatures (up to 1000° C.) to achieve thermocatalytically. The use of titanium dioxide as a photocatalyst has demonstrated utility in air and water purification, in the capture of sulfur from vapor phase emissions and toxic metal species in combustion exhaust streams, in removal of contaminants from water including methyl tert-butyl ether (MTBE), and in alternative synthesis of partial oxygenates. There remain, however, developmental challenges (problems) to be overcome before heterogeneous photocatalysis can be widely used in large scale processes. These problems include a) the relatively low quantum efficiencies of the catalyst, b) the requirement of near ultraviolet light energy ($\lambda < 380$ nm) for activation, and c) the inability to construct photocatalytic reactors wherein light distribution is effective and incident on the particle surfaces as required for designing larger scale reactors.

Many studies have been directed toward establishing the relationship between solid-state characteristics and physical characteristics and the photoactivity of the titanium dioxide. The synthesis route is a critical factor in controlling the characteristics of the particulate titanium dioxide product, and its photoactivity. Aerosol processes have proven to be viable routes for the synthesis of nanostructured, pristine and metal doped titanium dioxide particles. Such processes have also been used to deposit titanium dioxide films of varying thickness for different applications. Titanium dioxide films have been demonstrated to be useful in solar cell applications, for the protection of wood, antifog/self-cleaning glass and protection of steel against corrosion. Of all the different methods used for deposition and coating, the flame atmospheric pressure processes, wherein the coating can be produced in a single step, is preferred. Furthermore, flame aerosol coating methods can be readily scaled up to coat large areas.

The geometry of the photocatalytic reactor is also an important factor with respect to the distribution of the light so that it is incident on the titanium dioxide surface. Several different designs have been tested and the results reported in the literature. However, the current technology suffers lack of uniform illumination of the catalyst, inefficient photon utilization, the high cost of energy use, and lack of potential for scaling-up. Nanostructured fixed film reactors have also been demonstrated to be viable for partial oxidation applications. Falling film designs have been demonstrated to be effective in the degradation of MTBE in groundwater samples. Comparative studies have shown that installation costs of conventional photocatalytic reactors are 10 times greater, and annual costs are seven times more than those of granular activated carbon for removing organic compounds from air.

While surface coronas have been generated in electrostatic precipitator type configurations in cylindrical tubular flow reactors, the reactors are not desirably compact.

Surface corona is an electrical discharge (frequently luminous, non-thermal plasma) at the surface of a conductor or between two conductors of the same transmission line, accompanied by ionization of the surrounding atmosphere and often by a power loss. Surface corona discharge technology is similar to the natural process of ozone production via lightning. It occurs when the electric field around the conductor exceeds the value required to ionize the gas, but is sufficient to cause a spark discharge, frequently luminous. Using a surface corona discharge system, ozone is produced by passing air or oxygen through a high voltage electrical discharge, e.g. a surface corona. A minimum of approximately 5,000 volts of electricity is necessary to create the surface corona (14,000 is a practical design maximum voltage). Oxygen in air (containing 21% oxygen) or concentrated oxygen (95% pure oxygen) dried to a minimum of −60° C. (−76° F.) dew point, when passed through the surface corona, has its $O_2$ bond split, freeing two oxygen atoms which then collide with other oxygen molecules to create ozone ($O_3$).

Surface corona generates lower energy electrons (10-20 eV) as compared to the electron beam discharges which produce very high-energy (keV-MeV) electrons. These low energy electrons are accelerated from a very low level of kinetic energy along the high voltage surface corona region and eventually collide with a gas molecule and lose energy by excitation, ionization, dissociation or attachment. After transferring energy to the gas molecule, the low energy electrons are re-energized by the electrical field.

A surface corona discharge also produces a low power UV light on the order of ~2.0 W, in contrast to the high power UV light obtained from a UV source (1000 kW). Yan et al. have shown that surface corona induced non-thermal plasma can be produced by using pulsed streamer surface corona or by dielectric barrier discharge (*J. Electrostatics* 44, 17 (1998); *J. Electrostatics* 51-52, 218, 2001). Surface corona discharges have a number of useful applications. For example, they are used in ozone generators, photocopying machines and electrostatic precipitators. Dielectric barrier discharge driven by an AC power supply has been widely used in the ozone industry. In practice, ozone concentrations of 1-2% using air, and 3-8% using oxygen can be obtained by surface corona discharge generators. Most of the applications so far, such as disclosed by Grymonpre et al., (*Chem. Eng. Sci,* 54, 3095, 1999; *Chem. Eng. Journal* 82, 189, 2001, *Chem. Eng. Sci.* 56, 1035, 2001), have employed an aqueous-phase pulsed streamer surface corona reactor. The dry dielectric barrier discharge based surface corona has been mainly used for the generation of ozone. Researchers such as Futamura, et al. *J. Electrostatics* 42, 51, 1997; E. M. van Veldhuizen et al. *Plasma Chem. Plasma Processing* 16, 227, 1996; *Vacuum* 59, 228, 2000, *J. Electrostatics* 51-52, 8, 2001, and B. S. Rajanikanth, S. Rout, *Fuel Process, Technol.* 74, 177, 2001, have shown that surface corona reactors can be used as the primary treatment for the purification of air and water, as well as the treatment of exhaust gas for the decomposition of VOCs and removal of $SO_2$ and $NO_x$.

However, this technology has not been used or explored in the oxidative transformation of organic compounds to value-added products and intermediates. Oxidation of alcohols to aldehydes, ketones or carboxylic acids is one of the most desirable chemical transformations in organic synthesis as these products are important precursors and intermediates for many drugs, vitamins and fragrances. Oxyfunctionalization of hydrocarbons as shown by Barton et al., *J. Chem. Soc. Chem. Commun.* 731, 1983; J. M. Thomas, *Nature* 314, 669, 1985; and Ito et al., *Nature* 314, 721 1985. Such oxidation reactions are widely used in the chemical industry due to the wide ranging utility of the ensuing functionalized compounds as raw materials and intermediates in industrial and pharmaceutical chemistry. As reported for example by R. A. Sheldon et al. *Catal. Today* 57, 157 2000; P. Griffith, J. M. Joliffe, Dioxygen Activation and Homogeneous Catalytic Oxidation, Simandi, L. L., Ed. Elsevier, Amsterdam, 1991, the industry has developed numerous methods for oxidation of alcohols and hydrocarbons. However, the primary processes for these oxidative transformations still employ toxic, corrosive and expensive oxidants such as chromium (VI) and manganese complexes, stringent conditions like high pressure and/or temperature and use of strong mineral acids as reported by R. A. Sheldon, J. K. Kochi, *Metal-Catalyzed Oxidation of Organic Compound*, Academic Press, New York (1981) and W. P. Griffith, J. M. Joliffe, *Dioxygen Activation and Homogeneous Catalytic Oxidation* (Simandi, L. L., Ed). Elsevier, Amsterdam (1991). Some of the methods developed by Murahashi et al. *J. Org. Chem.* 58, 7328 1993, Inokuchi et al. *Tetrahedron Lett* 36, 3223, 1995, Iwahama et al., *Tetrahedron Lett,* 36, 6923, 1995, use $O_2$ in presence of at least a stoichiometric amount of a reactive aldehyde, which form the peracid as the actual oxidizing agent.

There are many reports on effective aerobic oxidation methods that use copper (P. Capdevielle, *J. Chem. Res.* 10, 1993, Munakata et al. *J. Chem. Soc., Chem. Commun.,* 219, 1980, Senmelhack et al. *J. Am. Chem. Soc.* 106, 3374, 1984, Marko et al., *Science* 274, 2044, 1996), palladium, Pd (Marko et al., *Science* 274, 2044, 1996, Mallat et al., *Catal, Today* 19, 247, 1994, Brink et al. *Science* 287, 1636, 2000) and ruthenium compounds (Jensen, J. S. Pugsley, M. S. Signam, *J. Am. Chem. Soc.* 123, 7475, 2001. Cornelis, *Synthesis* 909, 1985; Cseri et al., *Bull. Soc. Chim. Fr.* 133, 547, 1996; Heravi et al., *Chem. Commun,* 833, 1999; Narayanan, *Appl. Catal. A. Gen.* 199, 1, 2000) and using photocatalysis (Pillai, E. Sable-Demessie, *J. Catal,* 211, 434, 2002) Some of these methods are limited to benzylic alcohols and often require two equivalents of the catalyst per equivalent of the alcohol. Senmelhack, C. R. Schmid, D. A. Cortes, and C. S. Chon, *J. Am. Chem. Soc.* 106, 3374, 1984 showed that the presence of a base and additives like di (t-butyl azodihydrazine) require or involve a complex catalyst preparation that is difficult to recycle. In various studies (Pillai, E. Sahle-Demessie, *J. Catal.* 211, 434 2002; Parvulescu, et al., *J Mol. Catal. A; Chem.* 140, 91, 1999; Spinace, et al. *J. Catal.* 157, 631, 1995; Zahedi-Niaki, et al. *J. Catal.* 177, 231, 1998) hydrocarbon oxidations have been used in a homogeneous and heterogeneous catalytic systems employing different oxidants such as hydrogen peroxide, t-butyl hydroperoxide and molecular oxygen over various catalysts such as Na—GeX zeolite, TS-1 and Ti-MCM-41 and metal containing AlPO redox molecular sieves. The present inventors have recently reported effective hydrocarbon oxidations over vanadium phosphorus oxide catalysts using hydrogen peroxide (U. R. Pillai, E. Sahle-Demessie, *Chem. Commun.* 2142, 2002; *New J. Chem.* 27, 525, 2003). Although such processes are currently being utilized they have low energy efficiencies and generate environmentally hazardous waste and by-products. The increased environmental concerns in the recent years call for use of environmentally benign oxidants like molecular oxygen or hydrogen peroxide, rather than organic peroxide and stoichiometric metal oxides, which have been widely employed until now. Hydrogen peroxide oxidation, however, is relatively less economical due to its cost and relatively poor efficiency. In industrial chemistry, heterogeneous catalyst systems are preferred over homogeneous systems due to ease in separating and recycling. Therefore, there is a continuing demand for a more efficient, cost effective and environmentally friendly process for the oxidation of alcohols and hydrocarbons.

SUMMARY OF THE INVENTION

Accordingly, is an object of the present invention to overcome the above mentioned deficiencies in the prior art, such as the limited ability of ozonation to effectively treat many contaminants and the high-energy costs and difficulty in scaling-up of photocatalytic processes.

It is another object of the present invention to synthesize high-value organic compounds using non-stoichiometric methods, more specifically using ozonation and photoxidation with a semiconductor catalyst where no organic oxidation or metal oxides such as chromium (IV) are used.

It is also an objective of the present invention to provide a surface corona discharge reactor for the generation of ozone.

Another objective is to provide for the partial oxidation of organic compounds to desired products in gas or liquid phases using an embedded ceramic electrode system simultaneously generating ozone and activating a nanostructured titanium dioxide photocatalytic film.

Yet another objective is to provide for complete oxidation of volatile organic compounds to carbon dioxide and water using an embedded ceramic electrode system simultaneously generating ozone and activating a nanostructured titanium dioxide photocatalytic film, in gas or liquid phases.

It is another objective of the present invention to activate and oxidize hydrocarbons using a combination of light energy generated from the surface corona discharge and a specially prepared catalyst.

It is a further object of the present invention to provide a process for partially oxidizing organic chemicals to alcohols, ketones, and aldehydes, using flame deposited nano-structured photocatalysts. Thin film photocatalyst (0.02 to 0.2 μm in particle diameter) is coated using a flame aerosol method. The efficacy with which the photoreactor operates is influenced by the oxygen concentration, the light illumination, the properties of the photocatalytic coating, and the conditions within the fluid phase affecting contact of the organic compounds with the titanium dioxide surface.

It is yet another object of the present invention to produce industrially useful products with high selectivity while producing minimal byproducts and pollutants.

To achieve one or more of the foregoing objectives, the present invention combines a embedded electrode system which generates surface coronas in combination with a nanostructured titanium dioxide coating, both within a unitary compact photocatalytic reactor. More specifically, the present invention provides a novel reactor having electrodes embedded in a first surface in combination with a photocatalyst in the form of a nanostructured titanium dioxide film supported on a second surface which faces the first surface. The embedded electrode surface corona discharge electrodes generate ozone from oxygen and ultraviolet radiation, the latter serving to activate the photocatalyst.

In the present invention, upon application of a sufficiently high voltage, a surface corona is obtained that generates ozone and ultraviolet (UV) light that is incident on the second surface coated with a nanostructured titanium dioxide film, e.g. 0.02 to 0.2 μm in particle diameter, which is thereby activated to oxidize the organic compounds in liquid and/or vapor phase.

Accordingly, in a first aspect, the present invention provides a method for treatment of a fluid by oxidation, the method including supplying power to at least one electrode embedded in a first surface to generate a surface corona and to emit ultra-violet light; contacting oxygen with the surface corona to convert the oxygen into ozone; contacting the fluid with the ozone for oxidation of the fluid; receiving the emitted ultraviolet light at a second surface facing the first surface, the second surface containing nanostructured titanium dioxide, whereby the nanostructured titanium dioxide is activated; and contacting the fluid with the activated nanostructured titanium dioxide for photocatalytic oxidation of the fluid.

The method preferably uses nanostructured titanium dioxide formed by a flame aerosol method.

The fluid treated by the method of the present invention may be air or water containing at least one organic compound as a contaminant wherein the contaminant is oxidized by the ozonation and photocatalysis.

In another aspect, the present invention provides a highly efficient and economical process using the powerful oxidizing property of ozone in the oxidative transformation of organic compounds to value added products and intermediates, e.g. oxidation of hydrocarbons to alcohols, aldehydes, ketones and/or carboxylic acids and the oxidation of alcohols to aldehydes, ketones and/or carboxylic acids. The ozonation process is low in energy consumption and is also environmentally friendly, as it does not involve the use of any harmful materials or precursors. More specifically, the fluid may be at least one hydrocarbon and the contact with ozone and photocatalysis converts the hydrocarbon to at least one of an alcohol and a ketone. Alternatively, the fluid may be at least one alcohol and the contact with ozone and photocatalysis converts the alcohol into at least one ketone.

The present invention also provides a unitary apparatus for ozonation and photocatalytic oxidation of a fluid which includes a first wall element presenting a first surface having at least one electrode embedded therein and generating a surface corona and ultraviolet light; a second wall element presenting a second surface with a nanostructured titanium dioxide thereon, the second surface facing the first surface whereby ultraviolet light emitted at the first surface is received at the second surface and the nanostructured titanium dioxide is thereby activated; flow passage means for bringing a fluid containing oxygen into contact with the surface corona for ozonation, converting the oxygen into ozone, and for bringing a fluid into contact with the activated nanostructured titanium dioxide coating for photocatalytic oxidation; and a housing containing the first and second wall elements and the flow passage means.

The flow passage means may consist of a single flow passage defined between the first and second planar surfaces and wherein the flow passage has an inlet connected to a source of air containing a contaminant which is oxidized by the ozonation and photocatalytic oxidation.

In one preferred embodiment of the apparatus, the first and second wall elements are tubular and are concentric, with the first wall element surrounding the second wall element whereby an outer annular space, forming at least a portion of the flow passage means, is provided between the first and second surfaces.

In another feature of the apparatus that is preferred, the second tubular wall element is formed of a material transparent to ultraviolet light and the second surface coated with the nanostructured titanium dioxide is an interior cylindrical surface of the second tubular wall element surrounding a central passage.

The preferred configuration of the tubular apparatus further includes a central fluid feed tube concentric with the first and second tubular wall elements and dividing the central passage into an inner annular space and a central fluid passage. Further, the housing has top wall(s) and bottom wall(s), the bottom wall(s) closing lower ends of the inner and outer annular spaces and the central fluid feed tube has an open lower end axially spaced from a lower end of the tubular second wall element. A fluid outlet is provided in a top wall of the housing in communication with the inner annular space, whereby fluid to be subjected to ozonation and photocatalytic oxidation is introduced into an upper end of the central fluid feed tube, flows downward through the central fluid feed tube, flows out the lower end of the central fluid feed tube, reverses direction of flow, and flows upward through the inner annular space in contact with the second surface while subjected to the photocatalytic oxidation. A gas inlet and a gas outlet are respectively provided at the lower end and an upper end of the first annular space, whereby an oxygen-containing gas introduced through the gas inlet flows upwardly through the outer annular space and through the surface corona generated at the first surface, whereby it is subjected to the ozonation to form an ozone-containing gas, exits through the gas outlet and is led from the gas outlet to an injector (an example of a "mixing means") for mixing the ozone-containing-gas with the fluid upstream of entry of the fluid into the upper end of the central feed tube.

The tubular reactor embodiment may further include a gas feed tube extending through a top wall of the housing to an outlet located within the outer annular space adjacent the bottom wall of the housing.

Thus, in the tubular embodiment of the present invention, the "fluid flow passage means" includes the inner and outer annular spaces and the central fluid flow passage within the central fluid feed tube.

In one application of the method of the present invention (the aforementioned second aspect), high value organic compounds are synthesized using a combination of ozonation and photocatalytic oxidation in a surface corona discharge reactor in the presence of a thin film of 0.02 to 0.2 μm thick semiconductor material such as titanium dioxide deposited using a flame-aerosol method. The method (process) of the present invention can be applied to a variety of hydrocarbons, which can be oxygenated in either liquid or gas phase using ultraviolet light and a semiconductor photocatalyst under mild conditions.

Utilizing the first embodiment of the apparatus of the present invention, gas phase surface corona discharge oxidation reactions of alcohols and hydrocarbons are effected by flowing a mixture of heated oxygen and the organic vapor through the reactor, while electrodes embedded in a surface of the first wall element generate surface corona responsive to a high electric voltage. By selectively producing partial oxygenates and producing less by-products and pollutants than conventional oxidation reactions, the process achieves atom economy (economy of the atomic level) by direct oxygenation of hydrocarbons without using multiple stages and without loss of atoms.

Oxidation using surface corona reactor is not merely due to the formation of ozone which is a very good oxidizing agent. This was confirmed by the present inventors experimentally, using a surface corona discharger connected in series with another glass reactor wherein the ozone generated in the former is brought into contact with the vapors of cyclopentanol, with the glass reactor kept at the same temperature as the surface corona reactor (80° C.). No reaction is observed in this case. This shows the importance or the effect of surface corona (ozone plus the UV light generated) on the reaction. Generally, surface corona treatment is a very effective way to increase the surface tension of virtually any material. For example, corona treatment of a surface results in a surface that is unchanged to the naked eye, but in fact is much more receptive to inks, coatings, and adhesives. In a similar fashion, the contaminant or organic fluid itself may also be activated upon exposure to surface corona. A surface corona discharge generator accelerates electrons so as to give them sufficient energy to split the oxygen-oxygen double bond. Upon impact with another oxygen molecule, the two oxygen atoms which are produced by the collision react with other diatomic oxygen molecules to form ozone or activated oxygen which may further break into its atomic form and the free atomic oxygen may bond to the ends of the organic molecules present. Surface corona discharge also produces free radicals and ions. Gerisher and Willig, (*Curr. Chem.* 61, 50, 1976) have shown that in addition, the generation of UV light could produce electron-hole pairs believed to have an oxidation potential of Ca. 3.0 V, and therefore, has a considerable oxidizing capability. Therefore, the combined effect of ozone and UV light generation results in the oxidative chemical transformation.

Surface corona discharge units properly designed and containing modern safety features, can produce ozone reliably, efficiently, and safely for many years. Although ozone in the gaseous form is both toxic and corrosive, it presents no safety or handling problems in properly designed operating systems. Unlike most other oxidants that are stored on-site in bulk form, ozone is produced on-site in low concentrations and immediately consumed. Consequently, any accidental leakage can be easily controlled, as evidenced by ozone's long safety history in many applications.

The use of surface corona discharge for oxidation of alcohols and hydrocarbons through ozonation and UV/$TiO_2$ photocatalysis has the potential of preventing pollution at the source by replacing the conventional oxidation catalysts, heavy metals and strong acids, with environmentally friendly catalyst (titanium dioxide). $TiO_2$ catalysts prepared using a flame aerosol coating method have been shown to be highly active. The new technology can reduce large amount of water pollutants and reduce contamination in both indoor air and industrial air.

DESCRIPTION OF THE PREFERRED EMBODIMENTS

First Apparatus Embodiment

Figure 1A:
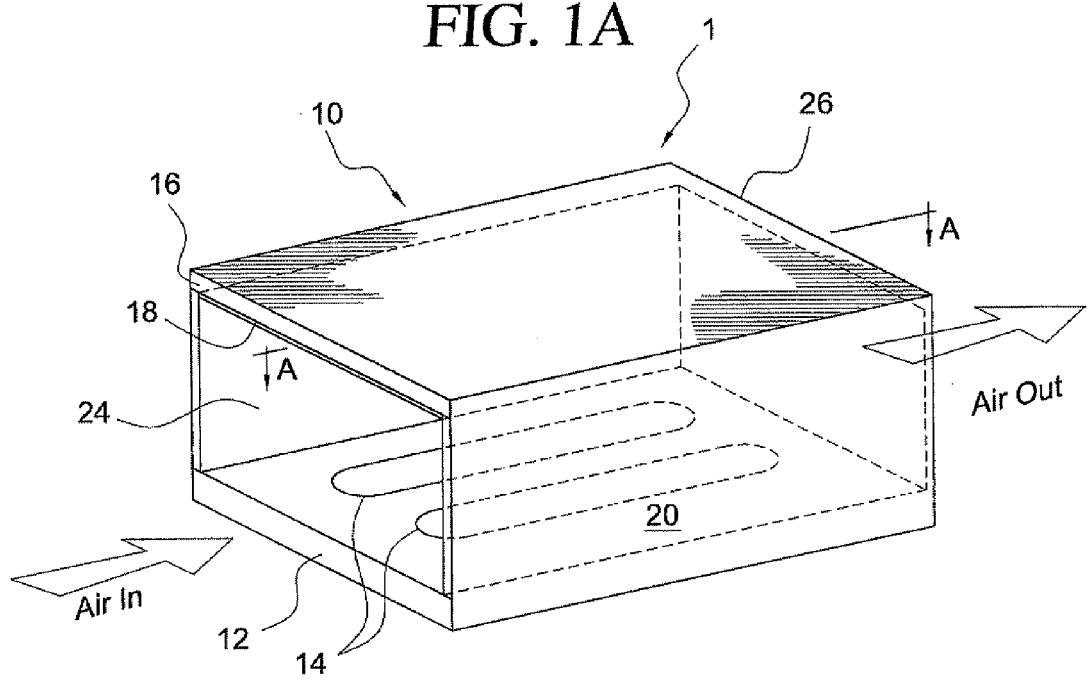
FIG. 1A is a perspective view of a first embodiment of the apparatus of the invention.
Figure 1B:
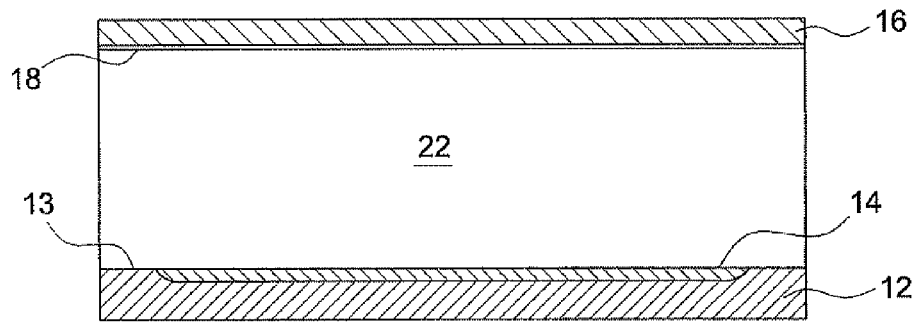
FIG. 1B is a cross-sectional view taken along line A-A passing through a surface corona electrode.

FIGS. 1A and 1B show one embodiment of a surface corona reactor 1 with a housing 10 formed of planar bottom wall 12 ("first wall element"), a planar top wall 16 ("second wall element") and planar side walls 20 and 22, with one open end 24 serving as an air inlet and an opposing open end 26 serving as an air outlet.

The bottom wall 12 is formed of a ceramic serving as a substrate and presents a first surface 13 having a plurality of surface corona discharge electrodes 14 embedded therein. While the present embodiment as illustrated in FIGS. 1A and 1B is shown as having two spaced corona discharge electrodes 14 in parallel, one or 3 or more such electrodes 14 could be used in accordance with the desired scale and/or capacity. Such embedded surface corona electrodes 14 are described in more detail in U.S. Pat. No. 6,039,816, issued to Morita et al. for "oxonizer, Wafer Purifier and Method of Cleaning an Ozonizer", the teachings of which are incorporated by reference herein.

The top wall 16 presents a "second surface" 18 in the form of a coating of nanostructured titanium dioxide. The nanostructured titanium dioxide coating 18 is a unitary film which, at the micro level, is seen as made up of adhering approximately spherical nano-sized particles. Aerosol flame coating is used to deposit the nanostructured titanium dioxide film on the wall 16 which, in a laboratory scale reactor, was Pyrex glass.

EXPERIMENTAL

Figure 2:
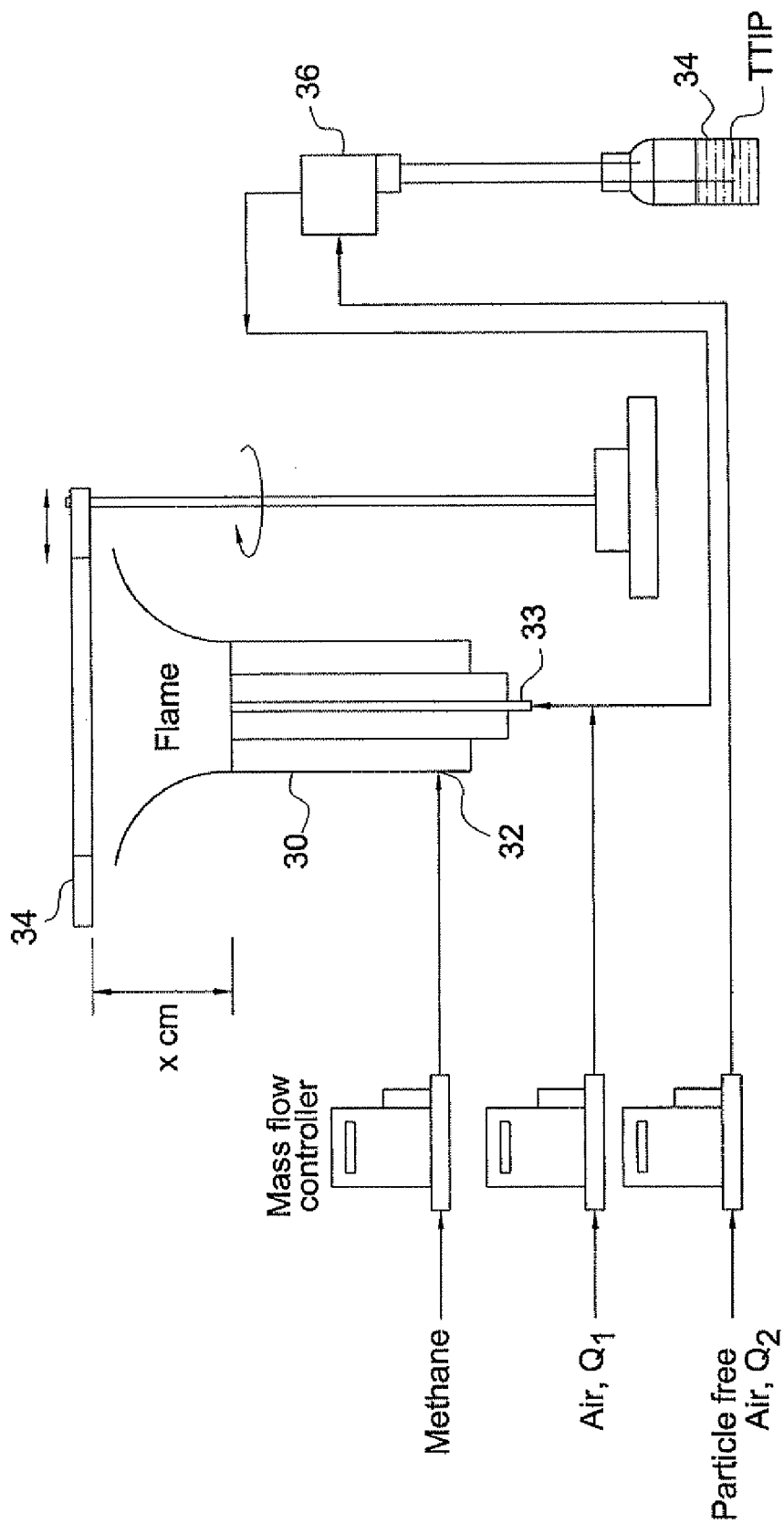
FIG. 2 is a schematic view of laboratory apparatus used to form $TiO_2$ film (1) in table 1.
Figure 3:
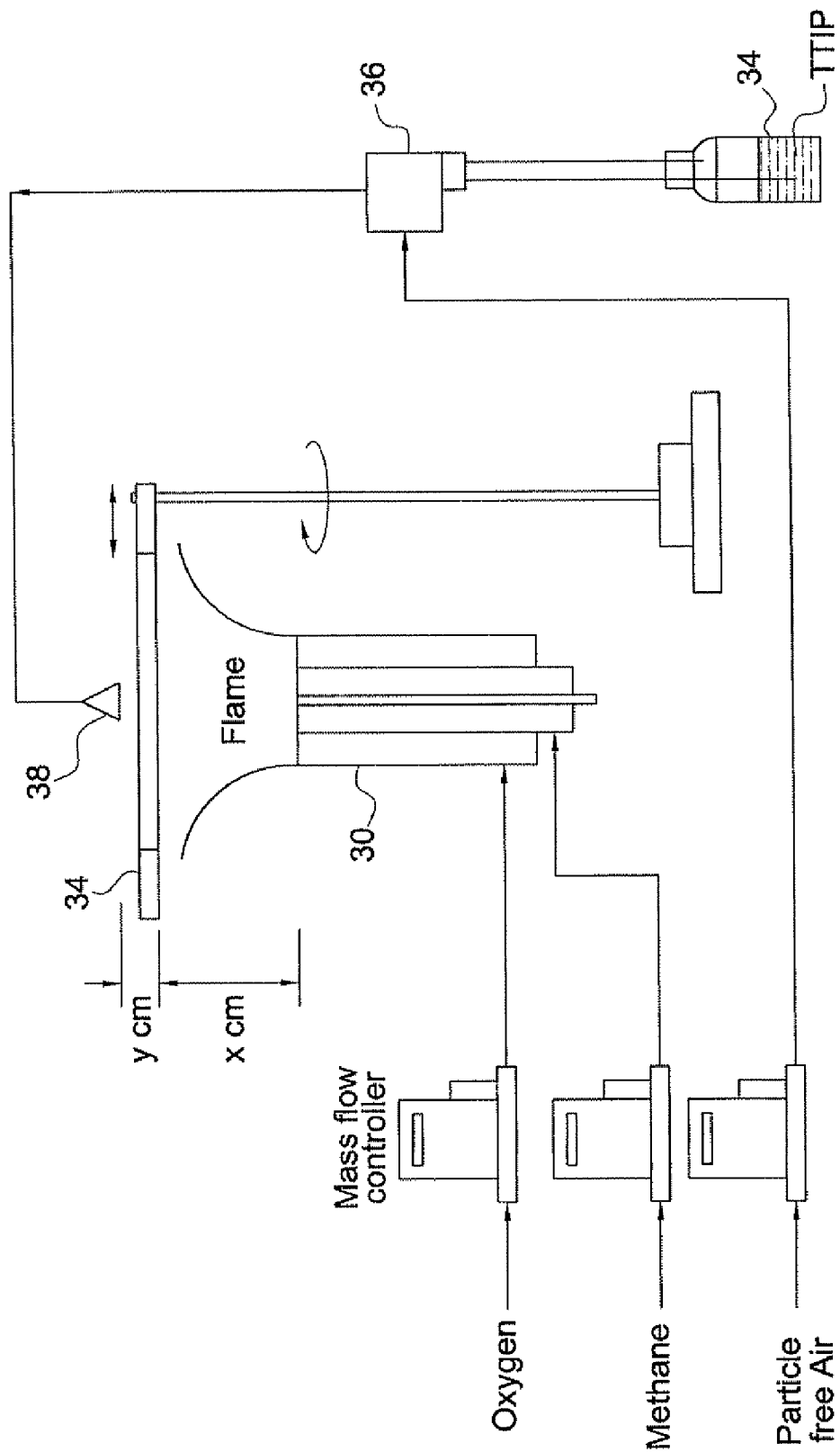
FIG. 3 is a schematic view of laboratory apparatus used to form $TiO_2$ film (2) in Table 1.

FIGS. 2 and 3 illustrate the configurations of systems used to coat $TiO_2$ on glass substrates for use in the inventors' studies. Two different coating methods have been used, resulting in coated particles of different morphologies. Both methods used a multi-port diffusion flame burner 30 and a deposition substrate. Methane was used as a fuel and supplied through the outer port 32. Titanium (IV) isopropoxide (TIPP) (97%) was used as a precursor and introduced through the inner port 33. Two different precursor feed methods were used. One method used the system shown in FIG. 2 including a bubbler 34, maintained at 60° C. by an isotherm water bath and heating tape, and a universal atomizer 36 containing the TIPP precursor and having an orifice size of 0.025 inch. Film 1 was formed by the first feed method using the system shown in FIG. 2 wherein air bubbled through the TTIP contained in bubbler 34 entrains the TIPP, carries the entrained TIPP to the atomizer, and introduced the atomized TTIP into the flame of burner 30 through the inner port 33. Film 2 was prepared using the similar system shown in FIG. 3 wherein the atomized TTIP precursor is sprayed from nozzle 38 onto the upper surface of the heated Pyrex glass plate, rather than being carried onto the lower surface, through the burner flame as in the case of film #2. All flow rates were precisely controlled by mass flow controllers. The coating substrate was a Pyrex high temperature-resistive glass plate that was held at a fixed height for a specific time on the steel plate substrate support 34. The coating conditions are summarized in Table 1. Films 1 and 2 were prepared by the foregoing flame coating method, and for comparison, film 3 was prepared by a dip coating method in which a five percent by weight slurry of commercially available titanium dioxide (Degussa P25) in acetone was prepared, and stirred vigorously to ensure that the particles remained suspended in solution. A glass plate (15 mm×55 mm×1 mm) was dipped into the solution, dried in open, ambient air at room temperature for 30 minutes and then in an oven at 150° C. for 1 hour. This process was repeated three times.

TABLE 1

Different coating methods used

| Film | precursor feed method | coating height | air flowrate total/$Q_1$/$Q_2$ [l pm] | methane flowrate [l pm] |
|---|---|---|---|---|
| 1 | bubbler | 6 cm | 10.4/8.3/2.1 | 1.23 |
| 2 | atomizer | 6 cm | 10.4/6.0/4.4 | 1.23 |
| 3 | dip coating | (see the above description) | | |

The characteristics of primary particles and films were investigated by X-ray diffractometer (XRD), BET surface area analyzer, Scanning Electron Microscope (SEM) and Scanning Mobility Particle Sizer (SMPS). A X-ray diffractometer (Rigaku) was used to examine the phase compositions and crystallite sizes; A BET surface area analyzer (Qantachrome, Autosorb®-1) was used to measure specific surface areas; and a Scanning Electron Microscope (Hitachi, Model number S-4500) was used to see the actual shape of the primary particles. A Scanning Mobility Particle Sizer (TSI Inc., an Electrostatic Classifier, Model 3080 using a Long Differential Mobility Analyzer (DMA), Model 3081 and a Condensation Particle Counter, Model 3025A) was used to measure particle size distribution of the titanium dioxide particles. A single stage dilution probe having a dilution ratio of 20 was used to sample the high concentrations of titanium dioxide particles.

The deposited titanium dioxide films were then incorporated into a photochemical reactor 1 to determine their photoactivity (FIG. 4) and to confirm that the ultraviolet light emitted from the surface corona generated by the embedded electrodes can activate the titanium dioxide films. The reactor contained ceramic substrates each having an embedded discharge electrode and a dielectric electrode (Morita et al., U.S. Pat. No. 6,039,816). High-frequency and high-voltage was applied between the electrodes to generate a surface corona. The reactor 1 used in this study consisted of embedded ceramic electrodes 14 and a nanostructured titanium dioxide film 18 in parallel with the electrodes. The inner volume of the reactor 1 was 5.64 ml (area: 16 mm×54 mm; distance between the electrodes 14 and titanium dioxide film 18: 6.3 mm).

The flame temperatures were measured by a B-type thermocouple (Omega, Pt-30% R/Pt-6% Rh,) with a digital indicator (Eurotherm, Model 840) and are listed in Table 2. The temperature gradient is a critical parameter that establishes the crystal phase composition of the resultant titanium dioxide. Experimental conditions were readily varied by altering the process conditions to obtain different phase compositions. For example, on addition of oxygen, higher temperature gradients can result in the formation of the anatase phase (Yang et al. *Nanostructured Materials,* 1996, 6, 675). The operating conditions were also varied to obtain different coating densities. The masses of the substrates before and after coating were measured. The titanium dioxide coating densities are shown in Table 3.

TABLE 2

Titanium dioxide film characteristics

| Film | Coating Temperature [° C.] | Mass per unit Area [mg/cm$^2$] | Phase composition anatase/rutile | Crystallite Size [nm] | Specific surface area [m$^2$/g] |
|---|---|---|---|---|---|
| 1 | 1170 | 0.36 | 75%/25% | 18 | 163.5 |
| 2 | 1280 | 0.53 | 76%/24% | 17 | 170.3 |
| 3 |  | 0.41 | 77%/23% | 22 | 50.77 |

TABLE 3

Statistical data of the particle size distribution measured by SMPS

|  | Bubbler | Atomizer |
|---|---|---|
| Geometric particle diameter (nm) | 19.2 | 25.2 |
| Geometric standard deviation | 1.43 | 1.50 |
| Total number concentration (#/cm$^3$) | 1.32E+07 | 1.42E+07 |
| Total surface concentration (nm$^2$/cm$^3$) | 2.30E+10 | 4.30E+10 |
| Total volume concentration (nm$^3$/cm$^3$) | 2.14E+11 | 3.89E+11 |

Figure 5:
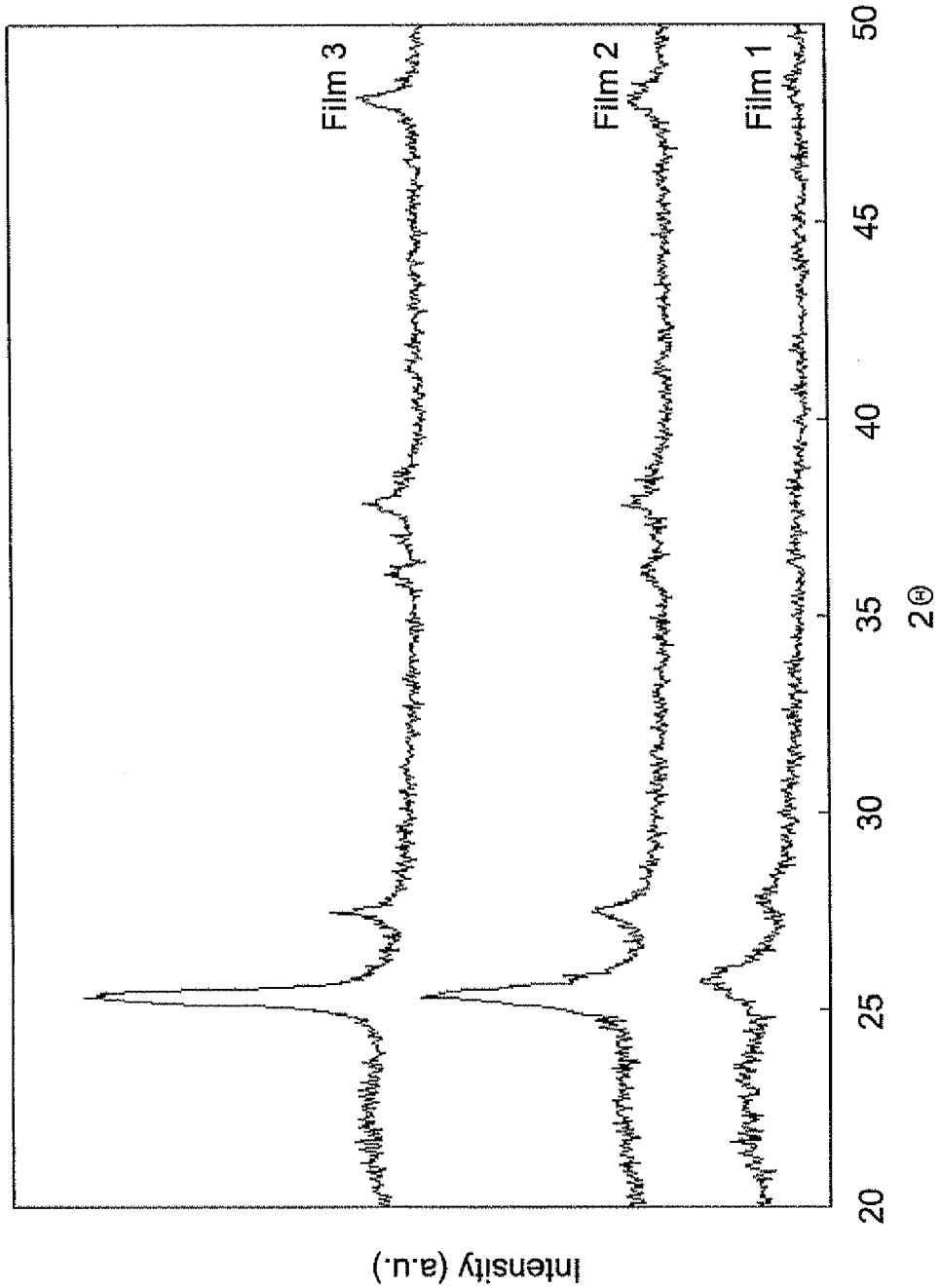
FIG. 5 shows X-ray diffraction patterns for the three $TiO_2$ films of Table 1.
Figure 6A:
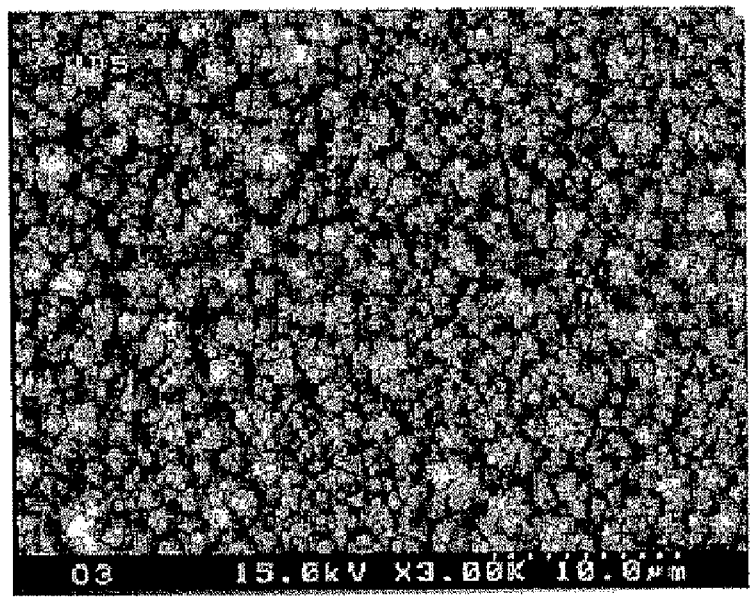
FIGS. 6(a) and 6(b) are representative SEM microphotographs of flame-deposited $TiO_2$ films used in the present invention.
Figure 6B:
Figure 7:
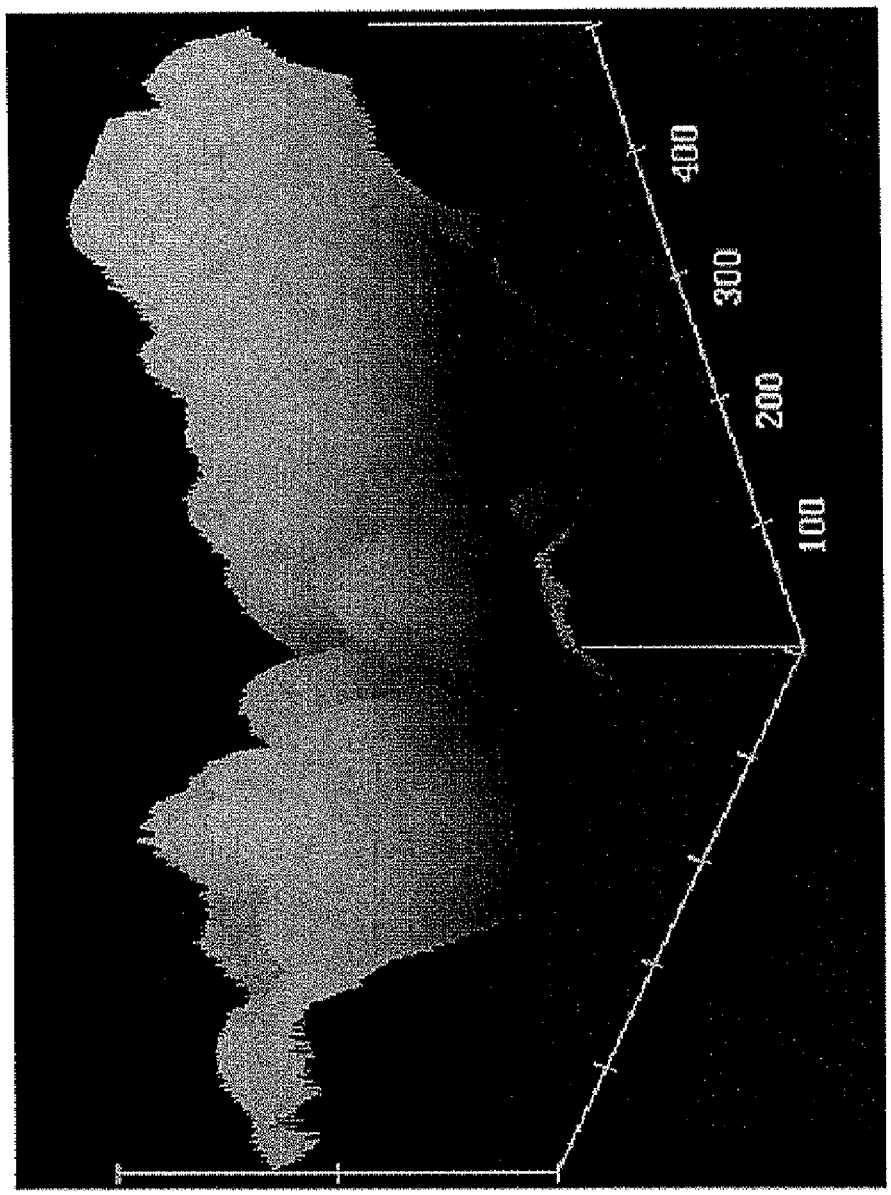
FIG. 7 is a representative AFM microphotograph of a flame-deposited $TiO_2$ film used in the present invention.

X-ray diffraction patterns are illustrated in FIG. 5, and the phase composition calculated according to Spurr and Myers (Spurr and Myers, *Anal. Chem.* 1957, 29, 760) and the crystallite sizes obtained by the Scherrer equation (*Azaroff, L. V. Elements of X-ray Crystallography*; McGraw-Hill; New York; 1968) are listed in Table 3. All three titanium dioxide coatings were found to have 75-77% of anatase and 25-23% of rutile. Representative SEM pictures of the titanium dioxide films are shown in FIGS. 6(a) and 6(b). The titanium dioxide films 1 and 2 prepared by flame coating show a uniform, but still porous structure which can provide more adsorption sites for the organic compounds. The other titanium dioxide film (film 3) prepared by a dip-coating method, however, had a bulky and agglomerated structure and uneven cracks formed during the drying process. Other SEM pictures, which are not shown here, with higher magnification, indicate that the primary particles deposited by the flame coating systems (FIGS. 2 and 3) are almost spherical. A representative AFM picture is shown in FIG. 7 and indicates the variation of thickness and morphology with position. A 500 nm×500 nm area was scanned. The atomic force microscopy tip was moved over the film and provided an idea of the surface roughness and morphology. The roughness varied from 0 to 150 nm, indicating an open, not smooth morphology, which morphology is desirable in a titanium dioxide film for photocatalytic reactors as it allows for both fluid and light penetration.

Figure 8:
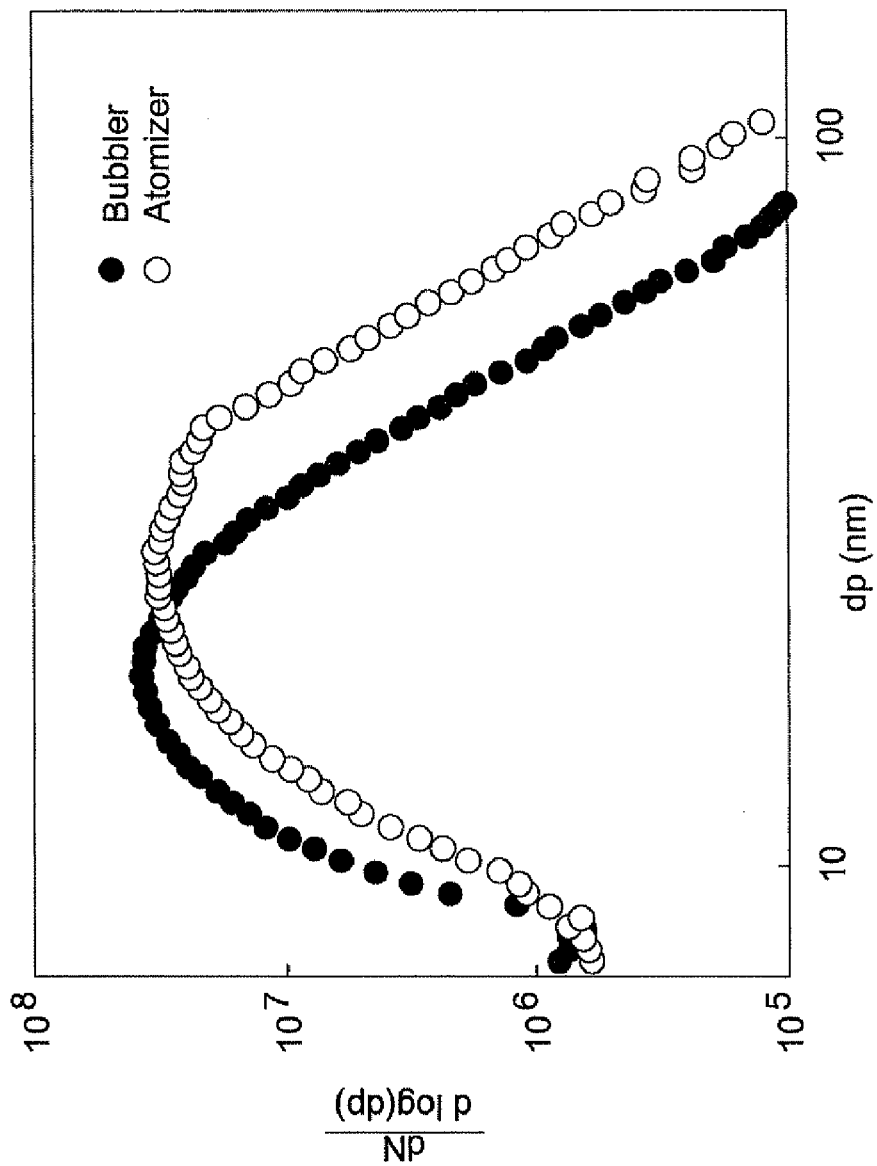
FIG. 8 is a graph of particle size distribution for $TiO_2$ particles generated by a bubbler and an atomizer, respectively.

The particle size distributions measured by a Scanning Mobility Particle Sizer are shown in FIG. 8, and the statistical data are reported in Table 3. The particles generated with a bubbler as a precursor feed method were smaller than those generated with an atomizer. The number concentrations, however, were not significantly different.

Figure 9:
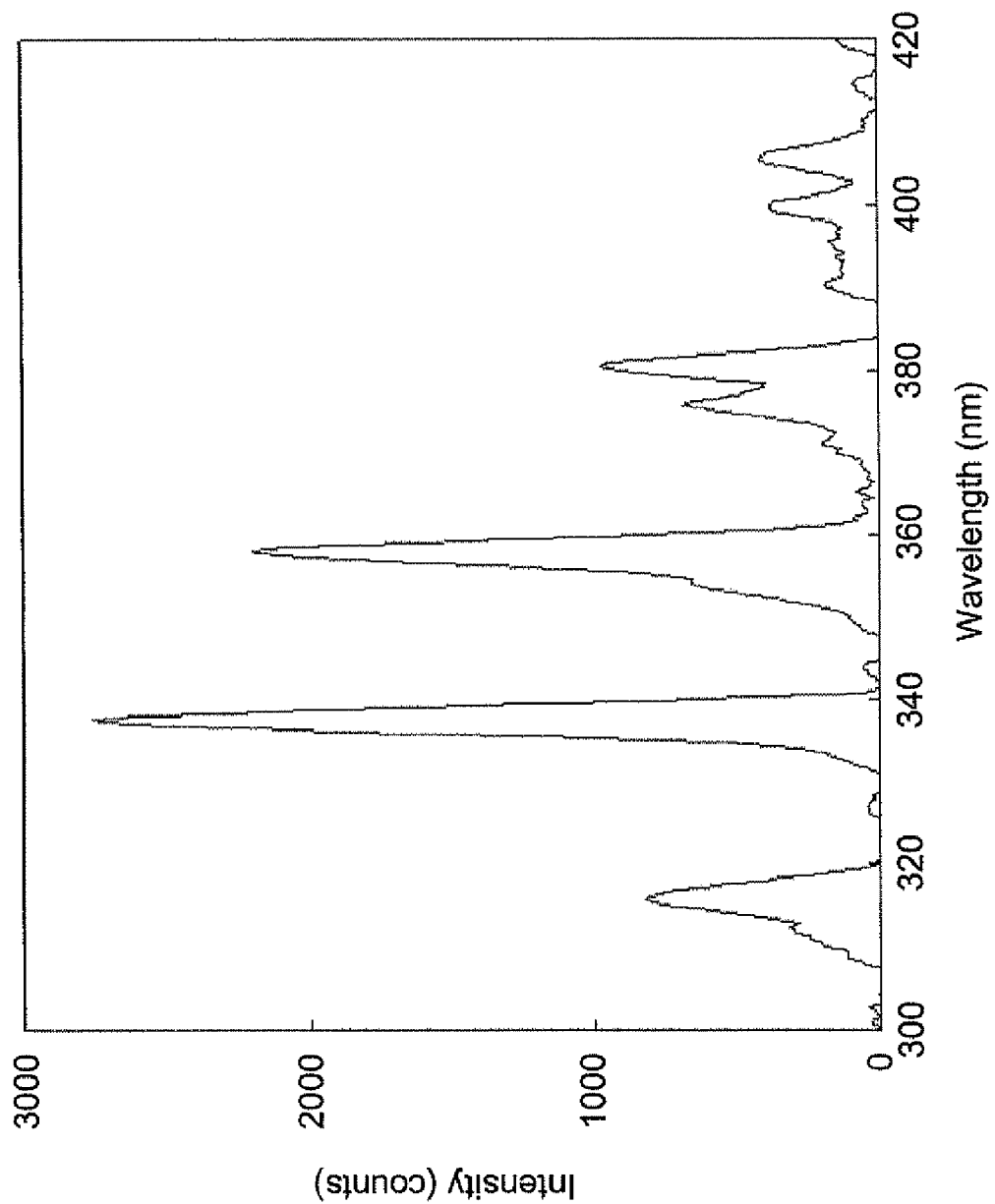
FIG. 9 is a graph of spectral light intensity of a surface corona released from the embedded electrode in Example 1.
Figure 10:
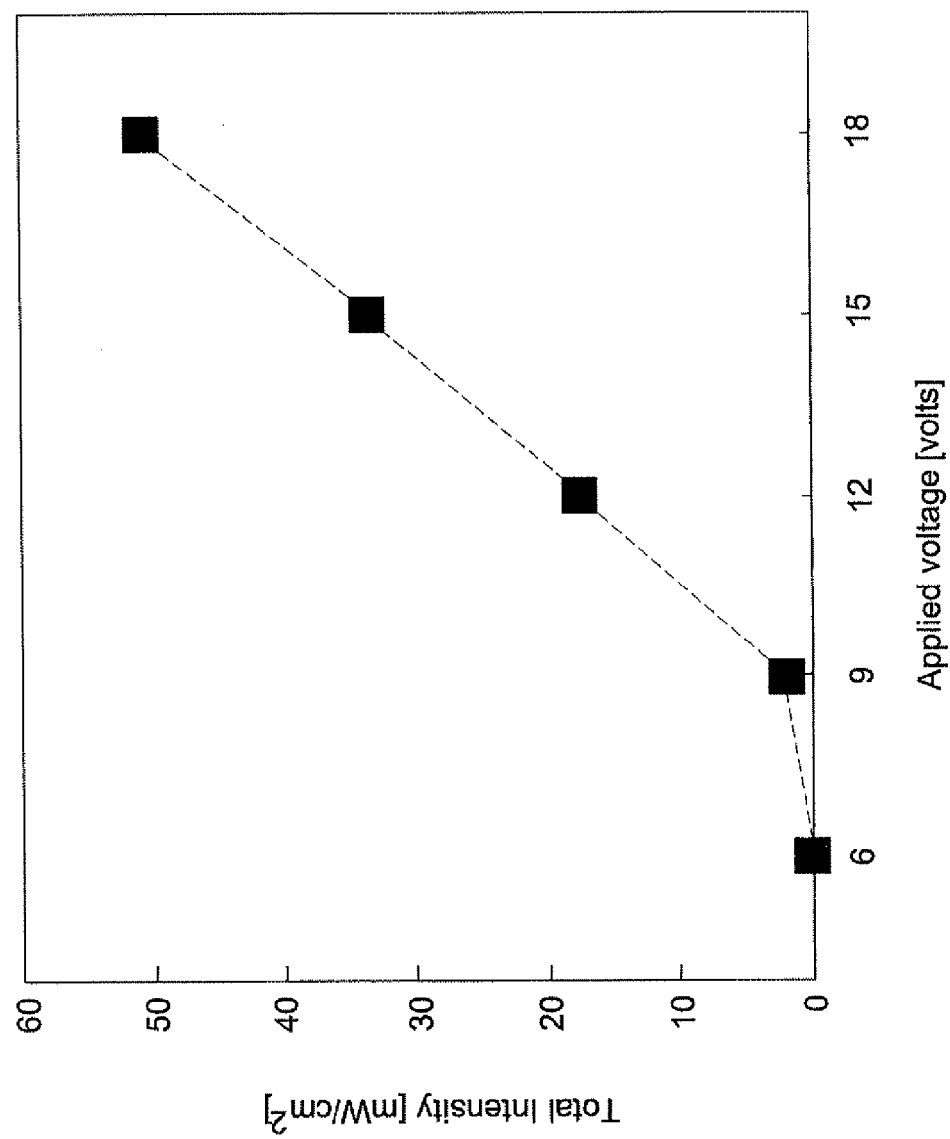
FIG. 10 is a graph of the total light intensity of a surface corona in Example 1.

The performance of a photochemical reactor depends on the characteristics of the titanium dioxide and the available intensity of the ultraviolet light. In view of the objective of minimizing the formation of other active radical species in the surface corona, the spectral light intensity measured with a fiber optic spectrometer (Ocean Optics Inc., Model S200-FL) and the total light intensity measured with an optical power meter (Newport, Model 1815-C) were mapped out and the results are shown in FIGS. 9 and 10. The UV light generated showed major peaks at 315 nm, 338 nm, 358 nm and 381 nm. Below 6 volts, no surface corona was initiated, and above 6 volts the light intensity increased with the applied voltage. The measured total light intensity ranged from 2 to 50 mW/cm$^2$. However, the absolute intensities at the specific wavelengths were not determined. To minimize the formation of active radicals, the applied voltage in the photoactivity tests was between 7 to 10 volts. The intensity in this range was sufficiently high and readily activated the nanostructured (0.02 to 0.2 µm) titanium dioxide films.

Example 1

Figure 4:
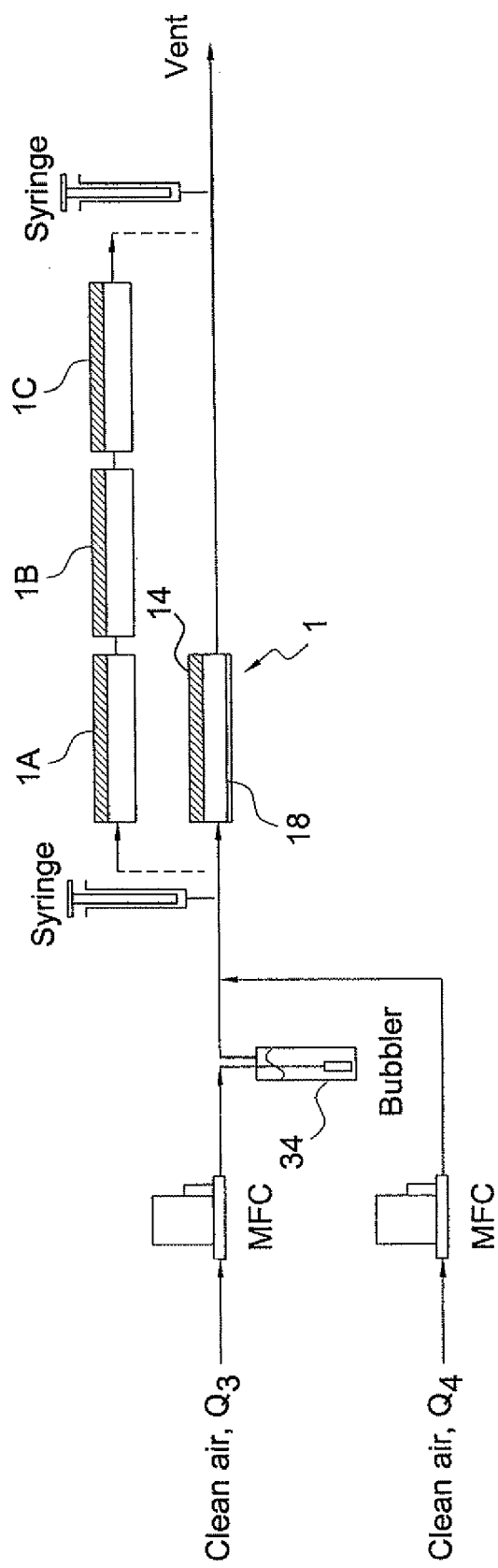
FIG. 4 is a schematic view of the laboratory apparatus used to determine photoactivity of the three $TiO_2$ films of Table 1.

Degradation of Trichloroethylene in a Flowing Air Stream Using Surface Corona in a Flat Plate Embedded Reactor with Titanium Dioxide Coated Surface FIG. 4 illustrates schematically the system of reactors used in the example, wherein each reactor included surface corona electrodes 14 embedded in a ceramic substrate facing an opposing surface with a coating 18 flame-deposited nanostructured titanium dioxide. The embedded surface corona electrode was demonstrated to be a compact source of ozone generation and UV light for effective activation of nanostructured titanium dioxide films. A flowing stream of air laden with trichloroethylene was effectively treated using the reactor with an embedded surface corona electrode. Trichloroethylene (TCE, 99.9%) was used as a target compound for establishing the photodegradation potential. TCE was introduced by passing particle-free, organic and carbon free air ($Q_3$) through a midget bubbler 34 (Aceglass, Model 7533, 30 ml), and the residence time and the inlet concentration of TCE were controlled by adding extra air ($Q_4$). The flowrates of TCE carrying air were controlled by the mass flow controllers (MFC). The concentrations of TCE were measured by taking samples, using a capillary column (syringe), upstream and downstream of the reactor and analyzing the samples using a gas chromatograph with a flame ionization detector (FID).

The parameters used in the photoactivity tests are shown in Table 4. The first set of tests was conducted with a single reactor 1 successively using films deposited by different methods. In the second set of tests (Table 4, II), the reactors 1A, 1B and 1C were connected in series, as indicated by the dashed line in FIG. 4, to demonstrate that, given sufficient residence time, the contaminant organic compounds could be completely degraded and mineralized.

TABLE 4

Experimental conditions for photoactivity testing

| Test | Number of reactors | coating case | Air flowrate Total/$Q_1$/$Q_2$ [l pm] | Applied Voltage [V] | Inlet concentration of TCE [mg/cm$^3$] |
|---|---|---|---|---|---|
| I | 1 | 1, 2, 3 | 0.2/0.04/0.16 | 7, 8, 9, 10 | 0.1 |
| II | 3 | 2 | 0.2/0.2/0 | 9.5 | 0.4 |

Figure 11:
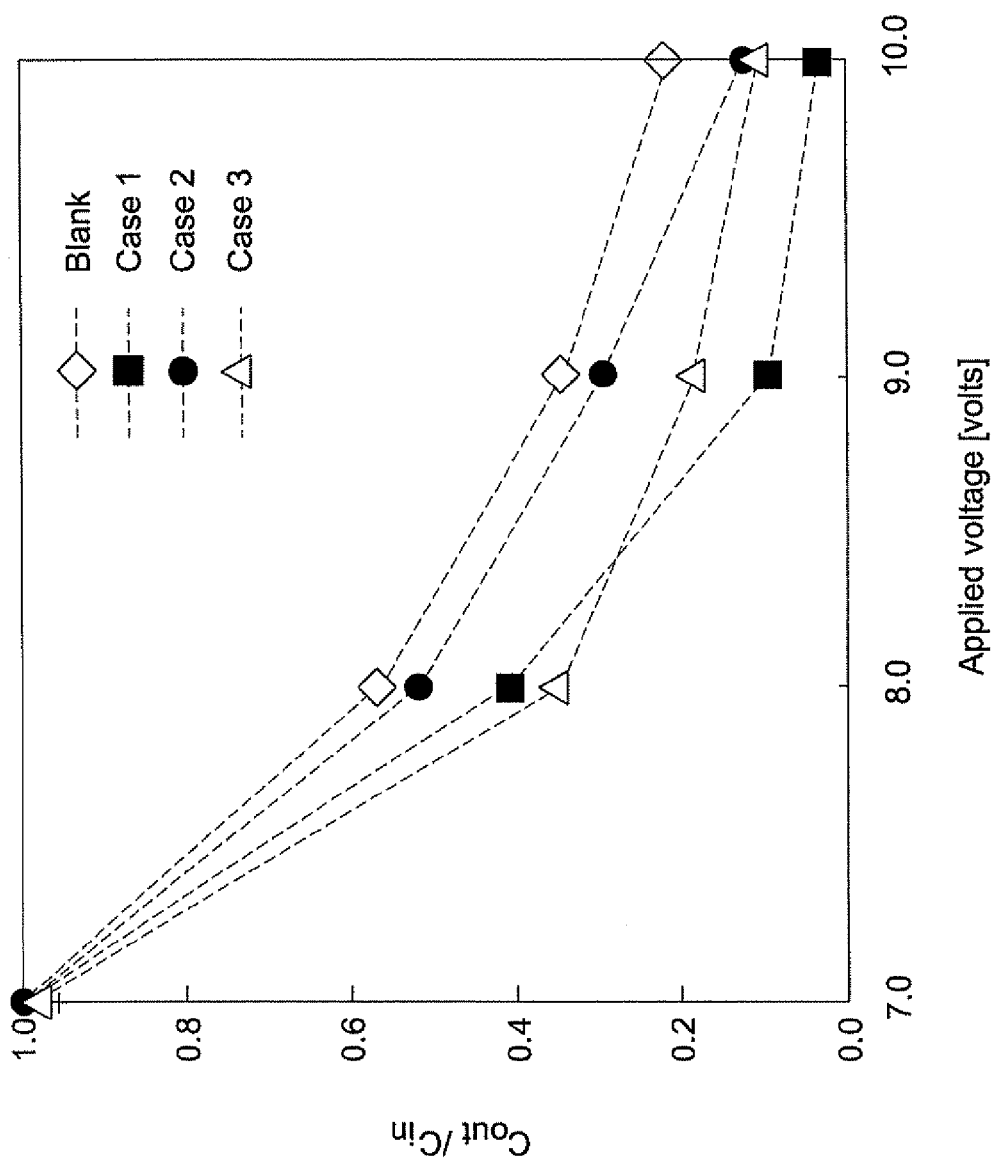
FIG. 11 is a graph of the gas phase concentration of trichloroethylene normalized by the initial concentration using surface corona discharge photocatalysis and ozonation for each of the three $TiO_2$ films and a control in Example 1.

The effects of the different applied voltages on the degradation of the gas phase concentration of trichloroethylene, normalized to the inlet concentrations, are shown in FIG. 11. Control experiments with a blank glass plate of the same thickness were conducted to examine the effect of ozone and other active radicals generated by surface corona. With an applied voltage of 7 volts, almost no surface corona was generated, and no measurable degradation of TCE was detected. With an applied voltage of 8 volts, some degradations of TCE was detected. There was some degradation of TCE inside the reactor due to ozone and other active radical species in the surface corona, in the absence of titanium dioxide film. The degradation efficiencies were enhanced with activated titanium dioxide film by the surface corona. Titanium dioxide film (3) coated by the dip-coating method showed degradation efficiency between those of the two other films coated by flame aerosol methods.

Figure 12:
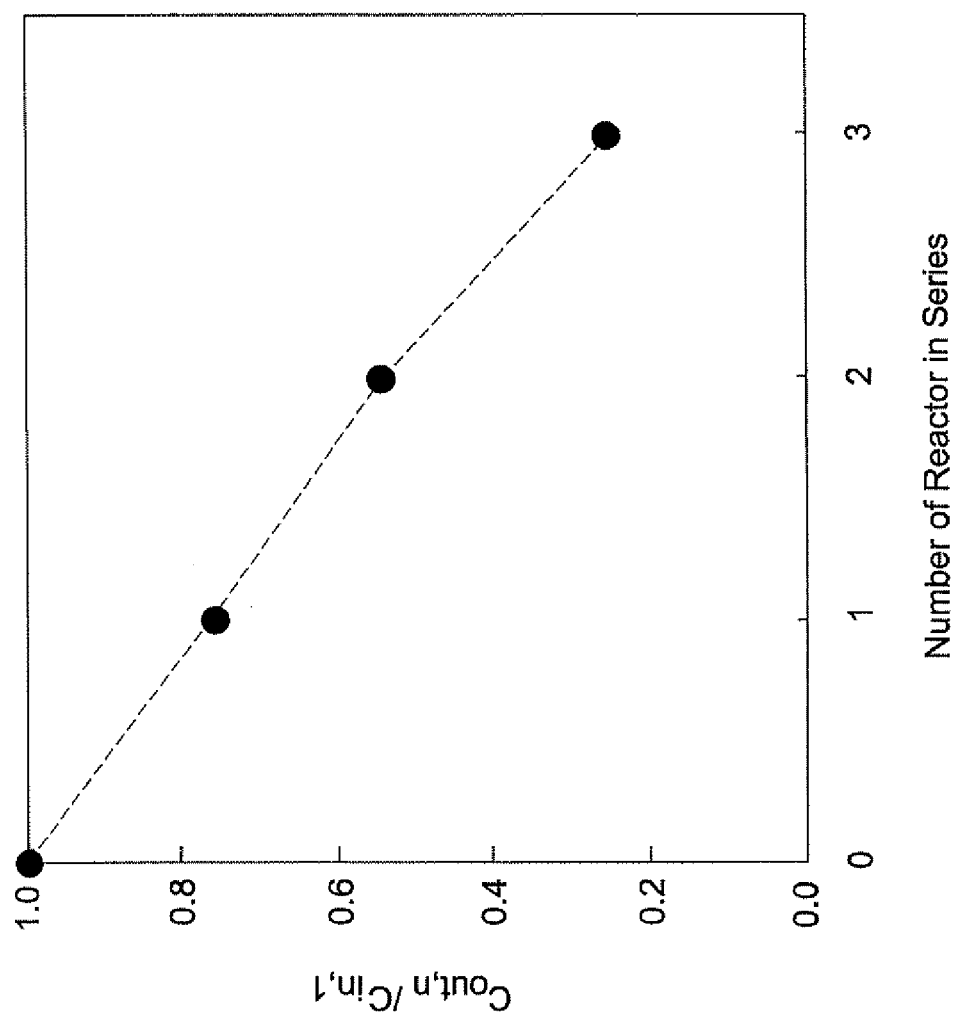
FIG. 12 is a graph that shows the degradation of gas phase concentration of trichloroethylene normalized by the initial concentration using three surface corona discharge reactors in series in Example 1.

With the reactors 1A, 1B and 1C connected in series to examine the effect of increased residence time, and with a gas flow rate of 0.2 liter per minute, the residence time in each reactor was about 1.7 second. A higher inlet concentration of TCE was used to better see the difference after each reactor. FIG. 12 shows the ratios of the outlet concentrations of TCE exiting each reactor to the inlet concentration of the first reactor. As the number of reactors which TCE vapor was passed through was increased, i.e. as the residence time increased, the degradation efficiency also increased accordingly. This correlation can be explained by the increased concentration of active radicals along the reactor.

Second Apparatus Embodiment

Figure 13:
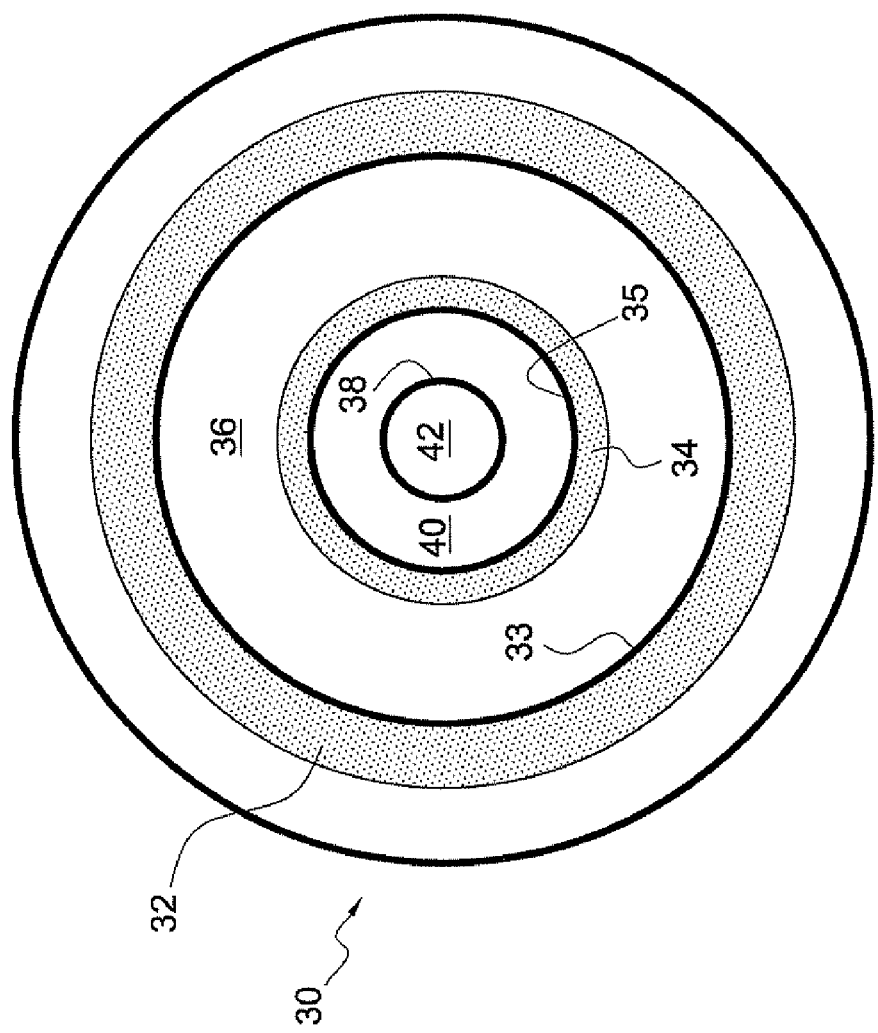
FIG. 13 is a schematic cross-sectional view of a second embodiment of the apparatus of the invention, taken along a plane perpendicular to the axis of the reactor.
Figure 14:
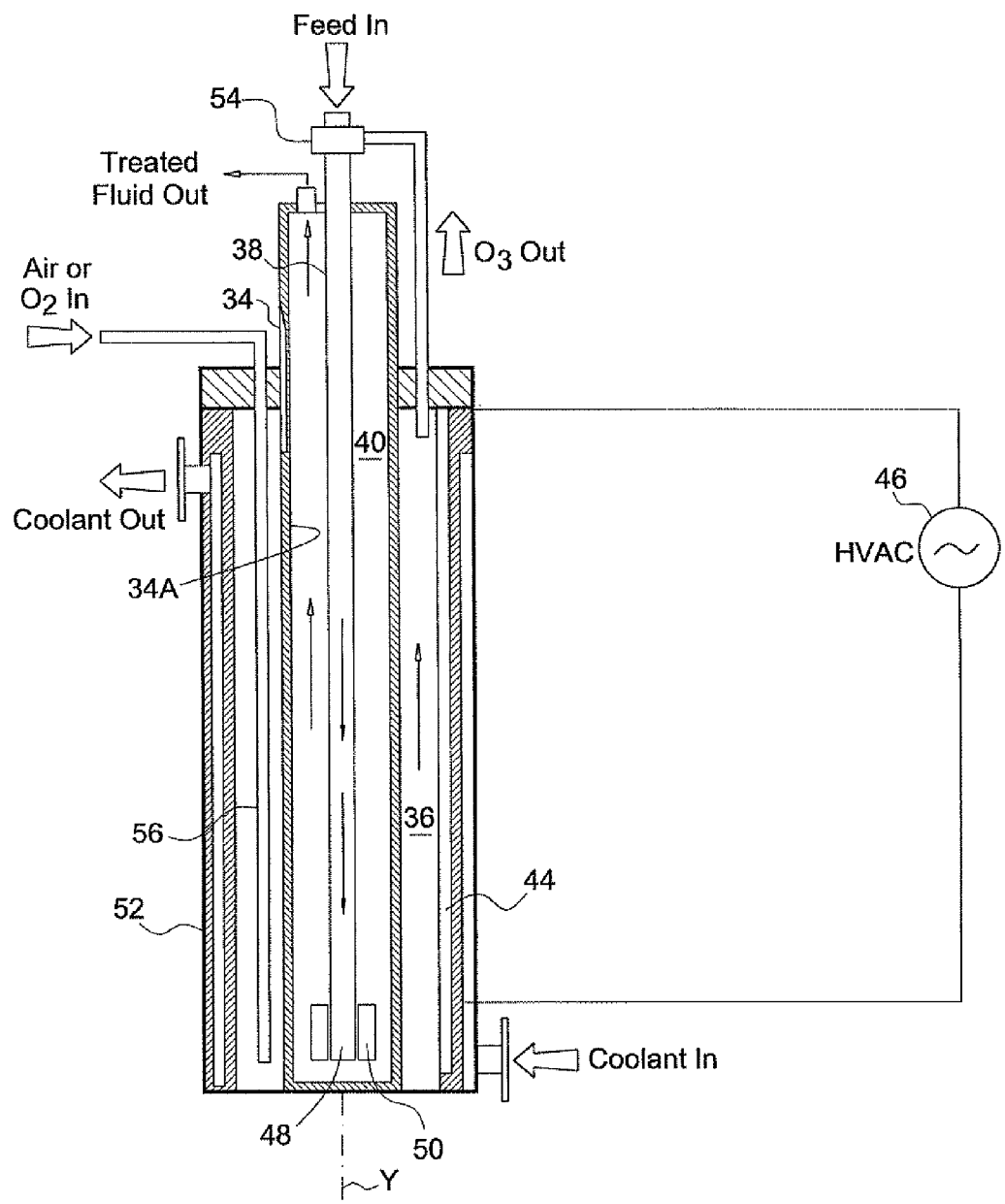
FIG. 14 is a schematic axial cross-sectional view of the apparatus of the second embodiment.

A second embodiment of apparatus in accordance with the present invention, in the form of a tubular reactor, is shown in FIGS. 13 and 14. The tubular reactor 30 is shown as including a tubular first wall element 32 presenting a first reactive surface having a plurality of elongated surface corona electrodes 44 embedded therein, evenly spaced around the circumference of the tubular wall element 32, and having their longest dimension oriented in parallel with the central axis Y of the tubular reactor 1.

A tubular second wall element 34 is concentric with and surrounded by the tubular first wall element 32. The tubular first and second wall elements 32 define an outer annular space 36 therebetween which is a portion of the "flow passage means" in this second embodiment. The tubular second wall element is fabricated of material transparent to the ultraviolet light emitted by the corona discharge electrode and presents a second surface having a coating 35 of the nanostructured titanium dioxide.

A central fluid feed tube 38 is concentric with the tubular first and second wall elements 32 and 34 and terminates at an open end 48 adjacent to and spaced from the bottom wall 50 of the reactor 1. The bottom wall 50 closes the lower ends of the outer annular space 36 and an inner annular space 40 formed between the tubular second wall element 34 and the central fluid feed tube 38.

The outer cylindrical housing wall 52 forms an annular coolant flow passage in cooperation with the tubular first wall element 32.

An injector 54 ("mixing means") serves to mix the ozone-containing gas exiting the outer annular space 36 with the fluid to be treated which is fed into the reactor 1 through the central fluid feed passage 42 defined by the inner cylindrical surface of the central fluid feed tube 38.

An oxygen (or air) feed tube 56 opens within the outer annular space 36, adjacent the bottom thereof, to feed oxygen into contact with the surface corona generated by the embedded surface corona electrodes 44.

In operation, the surface corona electrodes 44 are activated by a high voltage power source 46 to generate surface corona and ultraviolet light. Oxygen in the gas feed introduced through the oxygen feed tube 56 travels upward through the outer annular space 36 and in contact with the surface corona whereby it is converted into ozone. The ozone exits the outer annular space 36 and is mixed with the fluid to be treated prior to entry into the reactor 1. The ultraviolet light emitted by the surface corona discharge electrodes 44 passes through the transparent tubular second wall element and activates the titanium dioxide coating 35 on its inner cylindrical surface 34A for photocatalytic oxidation of the fluid passing upward through the inner annular space 40.

In the present embodiment the "fluid flow passage means" includes the interior 42 of the central fluid feed tube 38 and the inner and outer annular spaces 36, 40. Thus, in the present embodiment the fluid to be treated passes through the injector 54 wherein it is mixed with the ozone from the outer annular space 36, then passes downward through central passage 40 within the central fluid feed tube 38, reverses direction of flow upon exiting the lower open end 48 of the central fluid feed tube 38, and passes upward through inner annular space wherein it contacts the nanostructured $TiO_2$ for catalytic oxidation. Thus, the fluid to be treated, e.g. water containing an organic pollutant or liquid organics, is oxidized both by reaction with ozone and by the photocatalytic reaction.

Example 2

Photocatalytic Oxidation of Alcohols

Figure 15:
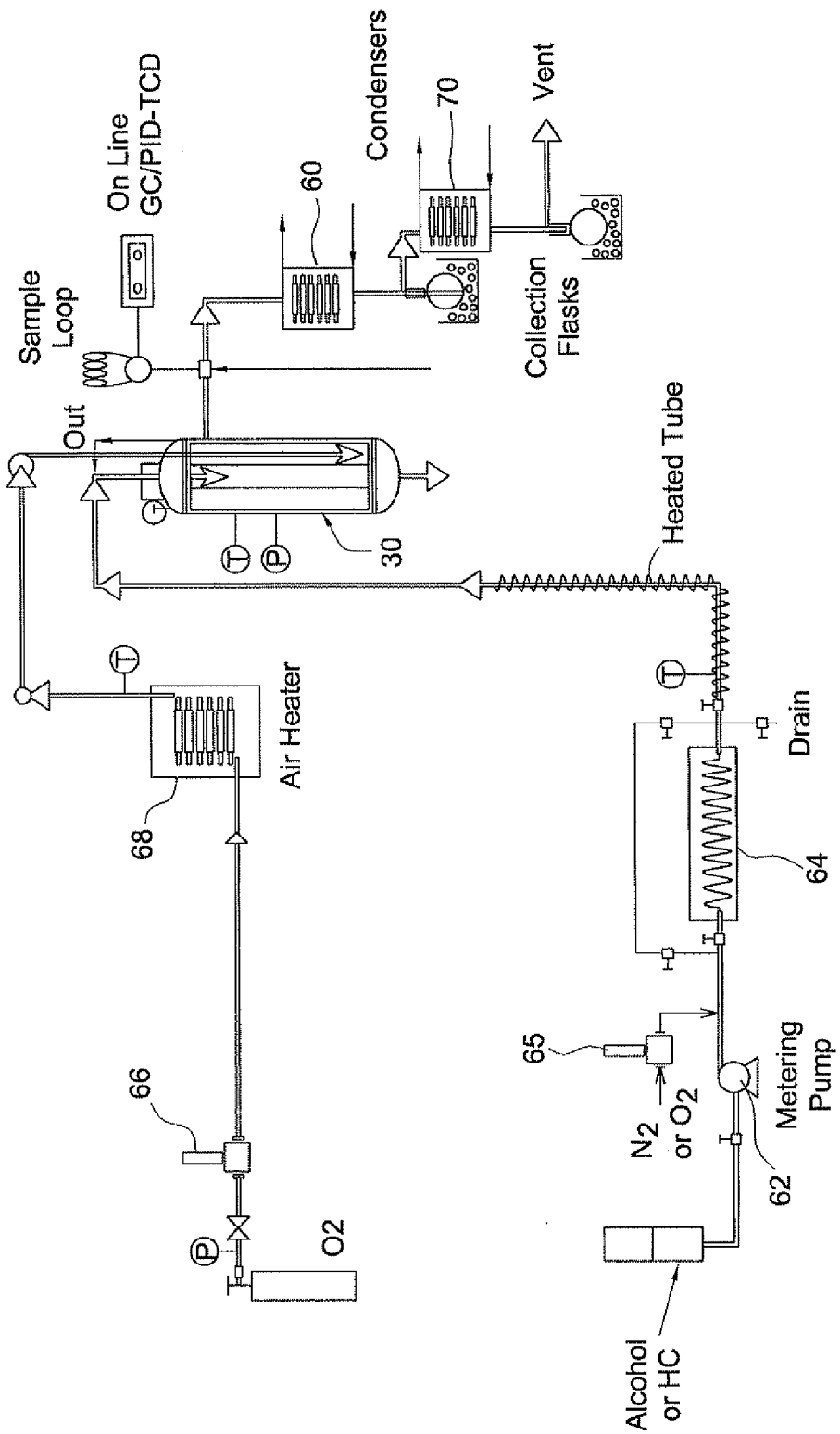
FIG. 15 is schematic illustration of the laboratory apparatus used in Example 2.

Example 2 employed the tubular flow surface corona discharge reactor 30 with immobilized titanium dioxide as illustrated in FIGS. 13 and 14, wherein the first wall element 32 was a cylindrical ceramic tube of 30 cm length and 6 cm internal diameter containing a series of electrodes on its inside wall with a 0.5-1.0 cm gap (inner annular space 40). The electrodes emitted high-voltage surface corona discharge into the gap, ionizing the gas (oxygen and the feed vapor) inside. The ceramic tube containing the electrodes was housed within a plastic jacket 52, for cooling by flowing water during its operation. The system used in the experiments of this example 2 is shown in more detail in FIG. 15.

The tubular second wall element 34 used in this example was a $TiO_2$ coated cylindrical glass tube of 28 cm length and 4 cm i.d., closed at lower end and inserted inside the outer ceramic tube 32 described above with proper bolted sealing at both the ends. The ceramic tube and glass tube are connected in such a manner that the ozone generated inside the ceramic surface corona discharger is carried into the glass tube along with the vapors of the alcohol to be oxidized. The alcohol is oxidized inside the glass tube, in the presence of ozone, UV light generated from the surface corona and the $TiO_2$ catalyst, and then vented to a collector 60, 70 that is cooled using a liquid $N_2$-isopropanol bath (−40° C.). The experiment was also performed in the absence of $TiO_2$ catalyst. The temperature inside the reactor near the catalyst surface was determined to be around 80° C. throughout all the experiments.

Surface corona-induced photocatalytic oxidations of alcohols were performed in gas phase using the annular reactor 30 described above by introduction a pre-heated mixture of oxygen and the alcohol vapor. Liquid alcohol was introduced to the reactor system via a metering pump 62 at a given rate and was heated and vaporized in an evaporator 64. Two mass flow controllers (MFC) 65, 66 were used to establish the desired flows of oxygen. Oxygen from the MFC 64 was pre-heated in air heater 68 and then introduced into the surface corona section of the reactor producing ozone which was then directed into the glass tube (coated with the $TiO_2$ catalyst). Oxygen from the second MFC 65 was used as carrier gas for the alcohol that was also pre-heated above the boiling point of the alcohol and introduced into the glass tube along with the ozone from the surface corona reactor (outer tube) at an average gas flow rate of 0.5 $Lmin^{-1}$. The exit stream from the reactor (outer annular space) was passed through two liquid nitrogen-isopropanol cooled traps 60, 70 connected in series to condense the oxidized products before venting out to a fume hood.

The effects of parameters including alcohol/$O_3$ ratio, surface corona power, and alcohol flow rate (contact time of the feed) on the conversion and product selectivity were investigated. The power utilization of the surface corona reactor was also estimated and compared with that of conventional photocatalytic oxidation. The amount of ozone produced in the reactor and consumed during the reaction was determined by iodometric titration using an acidified KI solution in a procedure similar to that described by Smith and co-workers (*American Laboratory News* 32, 12 2000).

Figure 16:
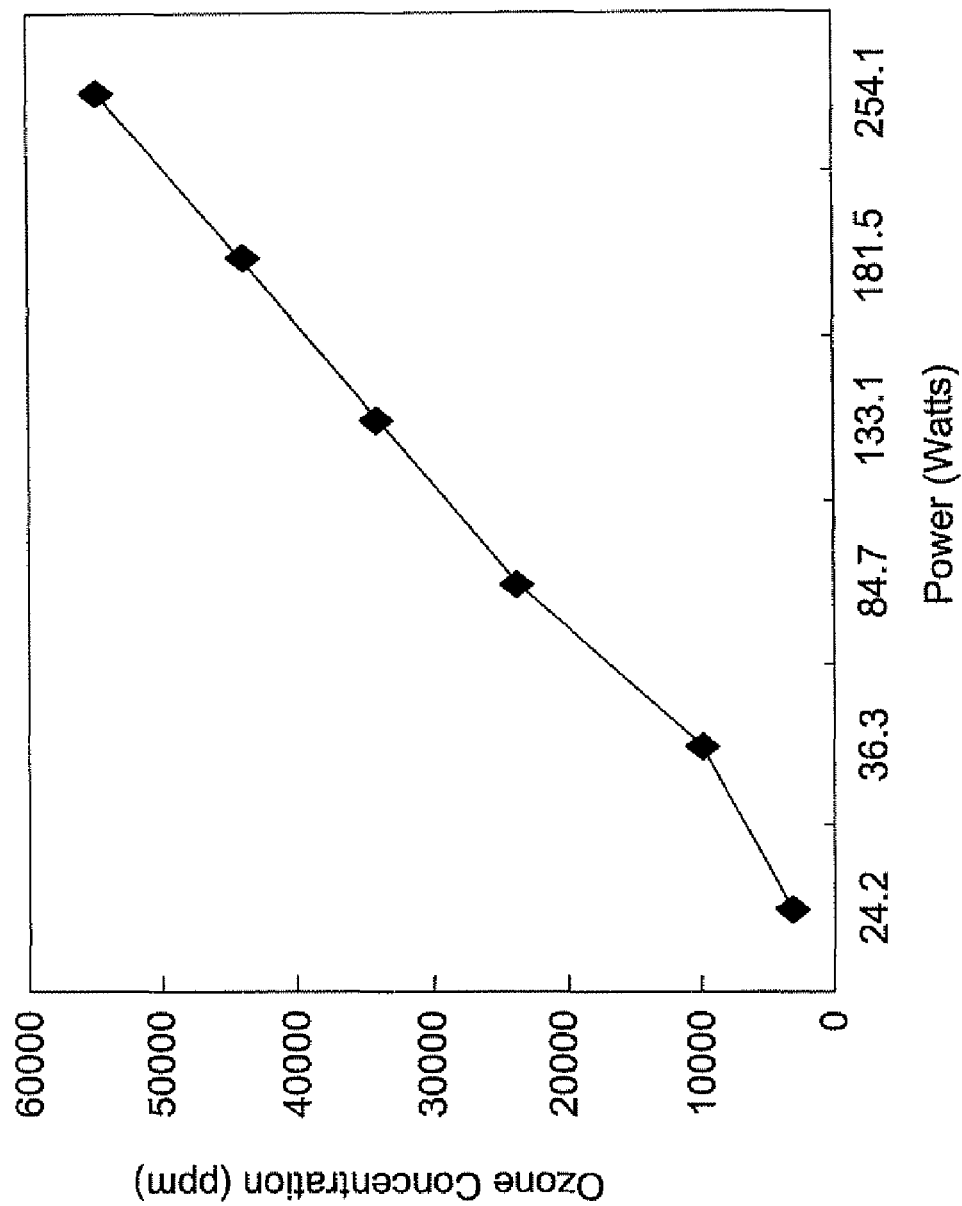
FIG. 16 is a graph of the concentration of ozone generated as a function of the power of the surface corona reactor at an oxygen flow rate of 0.5 $Lmin^{-1}$ with the flow reactor used in Example 2.
Figure 17:
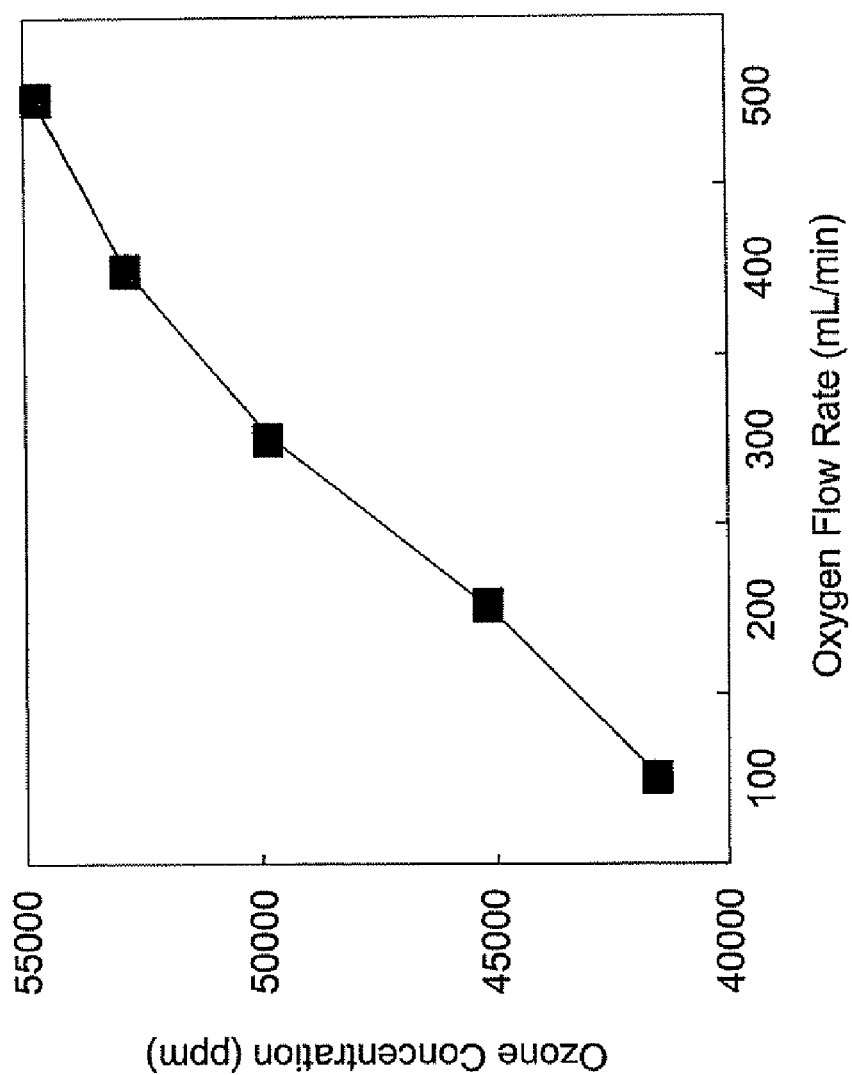
FIG. 17 is a graph of the amount (ppm) of ozone generated as a function of the flow rate of oxygen at a surface corona power of 254 Watts in Example 2.

The condensed liquid products were periodically analyzed by a gas chromatograph and a quadruple mass filter equipped mass selective detector with temperature programmed heating. Samples were analyzed with an injection volume of 1 μl. Quantification of the oxygenated products was obtained using a multi-point calibration curve. The amount of ozone generated in the surface corona reactor was studied as a function of the surface corona power and oxygen flow rate in the reactor. FIG. 16 shows that the amount of ozone generated increases with increase in the surface corona power. FIG. 17 shows that as the oxygen flow rate increases the ozone generation also increases. Approximately 5% ozone is generated at the maximum operating power of 254 Watts (2.1 A current) and an oxygen flow of 0.50 $Lmin^{-1}$. The amount of ozone generated increases from approximately 4% to 5% as the oxygen flow rate increases from 0.10 to 0.50 liter per minute. The temperature inside the surface corona reactor varied in the range 80-85° C. during the course of the reactions.

The results of surface corona-induced photo-oxidation of alcohols in the presence of $TiO_2$ photocatalyst are shown in Table 5 below A run in the absence of $TiO_2$ as in previous practice was also included for purposes of comparison. It is apparent that the conversion of alcohols to the corresponding carbonyls was more efficient in the present invention (third column) than with the conventional technique (eighth column). The selectivity to the corresponding carbonyl product is almost complete for secondary and cyclic alcohols with no appreciable formation of any side products. Primary alcohols, on the other hand, are converted mainly to their formic esters. The initial reaction rate is high in the presence of $TiO_2$, however, loses its advantage after a short time (2 h). One advantage of using $TiO_2$ in the surface corona reactor is in the oxidation of primary alcohols, which form the corresponding formate esters as the main products. In the absence of $TiO_2$ photocatalyst, primary alcohols are oxidized almost exclusively to their corresponding acids.

TABLE 5

Surface corona-induced photo oxidation of alcohols in the presence and absence of $TiO_2$

| Substrate | Products | Ozonation with photoxidation using $TiO_2$ | | | | | Ozonation only | | | | |
|---|---|---|---|---|---|---|---|---|---|---|---|
| | | Conv. (%) | A | B | C | D | Conv. (%) | A | B | C | D |
| Pentan-1-ol | -A (pentanal), -B (pentyl formate), -C (pentyl acetate), -D (pentanoic acid) | 52 | — | 81 | 19 | — | 25 | — | 20 | — | 81 |
| Pentan-2-ol | -A (pentan-2-one) | 72 | 100 | — | — | — | 38 | 100 | — | — | — |
| Cyclopentanol | -A (cyclopentanone) | 82 | 100 | — | — | — | 52 | 100 | — | — | — |
| Hexan-1-ol | -A (hexanal), -B (hexyl formate), -C (hexanoic acid) | 62 | 12 | 86 | 2 | — | 52 | 11 | 14 | 75 | — |

TABLE 5-continued
Surface corona-induced photo oxidation of alcohols in the presence and absence of TiO₂
| | | Ozonation with photoxidation using TiO₂ | | | | | Ozonation only | | | |
|---|---|---|---|---|---|---|---|---|---|---|
| | | Conv. | Selectivity (%) | | | | Conv. | Selectivity (%) | | |
| Products | | (%) | A | B | C | D | (%) | A | B | C | D |
|  | 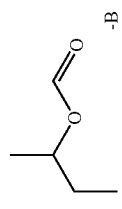 -A 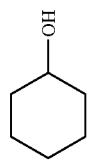 -B | 88 | 100 | — | — | — | 54 | 100 | — | — | — |
| 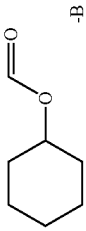 | 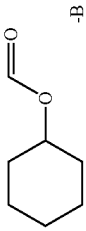 -A 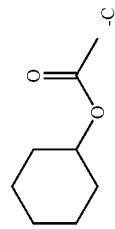 -B | 98 | 78 | 14 | 8 | — | 79 | 83 | 11 | 6 | — |
| | -C | 100 | 100 | — | — | — | | | | | |
|  |  -A | 100 | 100 | — | — | — | 86 | 100 | — | — | — |

TABLE 5-continued
Surface corona-induced photo oxidation of alcohols in the presence and absence of TiO$_2$
| | | Ozonation with photoxidation using TiO$_2$ | | | | | Ozonation only | | | |
|---|---|---|---|---|---|---|---|---|---|---|
| | Conv. | Selectivity (%) | | | | Conv. | Selectivity (%) | | | |
| Products | (%) | A | B | C | D | (%) | A | B | C | D |
|  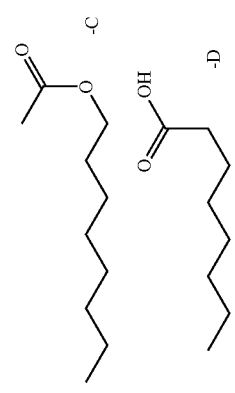 | 94 | — | 100 | — | — | 80 | 9 | 34 | — | 58 |
|  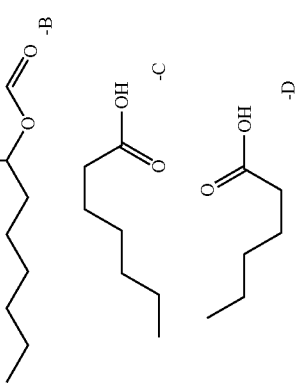 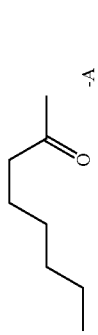 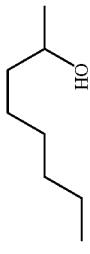 | 95 | 100 | — | — | — | 85 | 90 | 5 | 5 | — |

TABLE 5-continued

Surface corona-induced photo oxidation of alcohols in the presence and absence of TiO$_2$

| Products | Ozonation with photoxidation using TiO$_2$ | | | | | Ozonation only | | | | |
|---|---|---|---|---|---|---|---|---|---|---|
| | Conv. (%) | Selectivity (%) | | | | Conv. (%) | Selectivity (%) | | | |
| | | A | B | C | D | | A | B | C | D |
| (1-phenylethanol) | 95 | 78 | — | 11 | 11 | 1 | 75 | 2 | 20 | 4 |

Products: -A (acetophenone), -B (benzyl formate), -C (benzyl phenyl ether), -D (toluene)

Table 6 shows that by varying the surface corona power, the selective oxidation of primary alcohols to their corresponding aldehydes can be improved. Table 7 and Table 8 also show that selectivities can be improved by varying the amount of ozone generated or the space hourly velocity of the alcohol in the reactor. Primary aldehyde selectivity increases with decrease in surface corona power and ozone amount generated ($O_2$ flow through the reactor) or by increasing the feed flow (higher space velocity).

Generally, the rate of the reaction is relatively higher for the oxidation of alcohols even in the absence of $TiO_2$ photocatalyst when compared to the reaction rates over traditional catalysts. In other words, the surface corona oxidation methodology is a highly efficient oxidation technology where no expensive or environmentally undesirable materials are employed. The unreacted reactants can easily be recycled back to the reactor.

TABLE 6

Effect of surface corona power on the oxidation of 1-hexanol using molecular $O_2$ in the presence of $TiO_2$

| Products | Surface corona Power (Watts) | Conversion % | Selectivity A | B | C |
|---|---|---|---|---|---|
| Hexanal-A | 36.3 | 35 | 30 | 37 | 33 |
| Hexyl formate-B | 84.7 | 38 | 33 | 42 | 25 |
| Hexanoic acid-C | 254.1 | 54 | 08 | 45 | 47 |

$O_2$ flow 0.50 $Lmin^{-1}$,
temperature inside the reactor = 80° C.,
reaction pass time = 2 h

TABLE 7

Effect of the amount of ozone generated on the oxidation of 1-hexanol using molecular $O_2$ in the presence of $TiO_2$

| Products | Ozone Generated (ppm) | Conversion (%) | Selectivity A | B | C |
|---|---|---|---|---|---|
| Hexanal-A | 4887 | 25 | 46 | 30 | 24 |
| Hexyl formate-B | 0.20 | 45 | 30 | 37 | 33 |
| Hexanoic acid-C | 54736 | 54 | 08 | 45 | 47 |

Surface corona Power = 254.1 Watts,
temperature inside the reactor = 80° C.,
reaction pass time = 2 h

TABLE 8

Effect of feed flow rate (contact time of feed) on the surface corona-induced photo-oxidation of 1-hexanol using molecular $O_2$ in the presence of $TiO_2$

| Products | Feed Flow ($mLmin^{-1}$) | Conversion (%) | Selectivity A | B | C |
|---|---|---|---|---|---|
| Hexanal-A | 0.15 | 54 | 08 | 45 | 47 |
| Hexyl formate-B | 0.30 | 35 | 29 | 41 | 30 |
| Hexanoic acid-C | 0.60 | 24 | 45 | 35 | 20 |
|  | 0.75 | 18 | 53 | 30 | 17 |

$O_2$ flow rate = 0.5 $Lmin^{-1}$,
reaction pass time = 2 h
temperature inside the reactor = 80° C.,
Surface corona power = 254.1 Watts.

Example 3

Reaction Procedure for Surface Corona Induced Photocatalytic Oxidation of Hydrocarbons Example 2 was repeated using the same apparatus (FIG. 15) with substitution of various hydrocarbons, especially the cycloalkanes such as cyclohexane, cycloheptane and cyclooctane, and the results are given in Table 9 below. Alkane oxidation is usually very difficult to achieve due to the very inert nature of the C—H bond. Many of the commercial catalyzed hydrocarbon oxidations such as cyclohexane oxidation are operated at very low conversion levels (~4%). However, the surface corona oxidation of the present invention was found to provide hydrocarbon oxidation with high conversions in the range 20-35% (Table 8). Presence of $TiO_2$ in the surface corona reactor improves the reaction rate, as in the case of alcohol oxidation. However, table 8 shows that the higher rate in the presence of $TiO_2$ does not diminish even after 5 h of reaction, unlike the case of alcohol oxidation where the initial high rate is disappeared after 2 h of reaction.

TABLE 9

Surface corona-induced photo oxidation of hydrocarbons in the presence and absence of $TiO_2$

| Substrate | Products | Duration (h) | In the presence of $TiO_2$ | | | | In the absence of $TiO_2$ catalyst | | | |
|---|---|---|---|---|---|---|---|---|---|---|
| | | | Conv. (%) | Selectivity (%) A | B | C | Conv. (%) | Selectivity (%) A | B | C |
| cyclohexane | cyclohexanol -A, cyclohexanone -B, cyclohexyl formate -C | 1 | 18 | — | 100 | — | 14 | — | 100 | — |
| | | 2 | 20 | 10 | 90 | — | 19 | 11 | 89 | — |
| | | 3 | 31 | 12 | 83 | 05 | 28 | 14 | 86 | — |
| | | 4 | 38 | 24 | 71 | 05 | 32 | 24 | 76 | — |
| | | 5 | 38 | 24 | 71 | 05 | 32 | 22 | 78 | — |

TABLE 9-continued

Surface corona-induced photo oxidation of hydrocarbons in the presence and absence of TiO$_2$

| Substrate | Products | Duration (h) | In the presence of TiO$_2$ | | | | In the absence of TiO$_2$ catalyst | | | |
|---|---|---|---|---|---|---|---|---|---|---|
| | | | Conv. (%) | Selectivity (%) A | B | C | Conv. (%) | Selectivity (%) A | B | C |
| cycloheptane | cycloheptanone -B | 1 | 05 | — | 100 | — | 03 | — | 100 | — |
| | | 2 | 11 | — | 100 | — | 08 | — | 100 | — |
| | | 3 | 17 | — | 100 | — | 12 | — | 100 | — |
| | | 4 | 18 | — | 100 | — | 14 | — | 100 | — |
| | | 5 | 19 | — | 100 | — | 13 | — | 100 | — |
| cyclooctane | cyclooctanone -B | 1 | 07 | — | 100 | — | 06 | — | 100 | — |
| | | 2 | 11 | — | 100 | — | 10 | — | 100 | — |
| | | 3 | 22 | — | 100 | — | 12 | — | 100 | — |
| | | 4 | 22 | — | 100 | — | 12 | — | 100 | — |
| | | 5 | 22 | — | 100 | — | 13 | — | 100 | — |

Example 4

Figure 18:
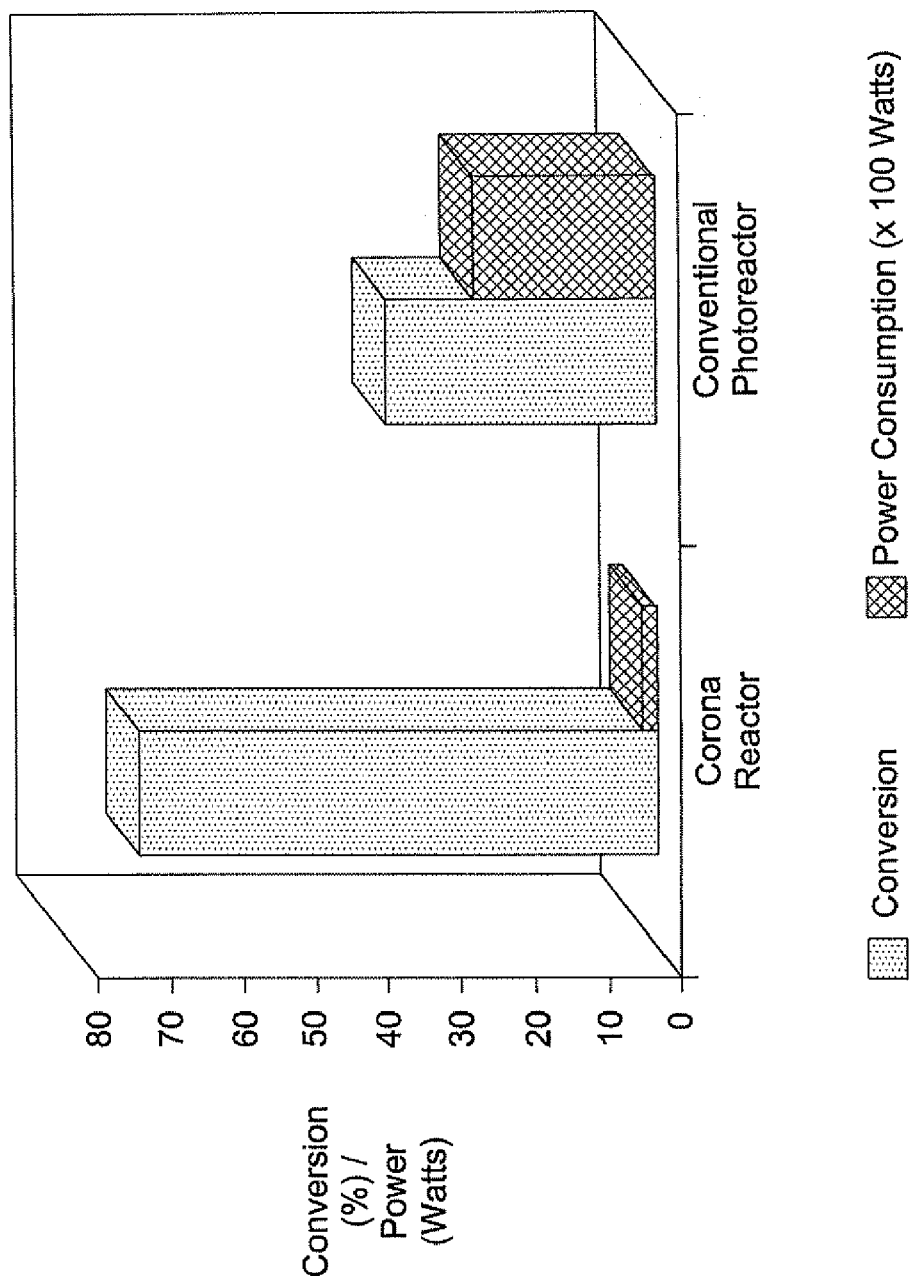
FIG. 18 is a graph presenting a comparison of the conversion and power usage of the conventional photoreactor that uses a lamp and the surface corona discharge reactor used in Example 4.

Comparative Study of Surface Corona Discharge Oxidation with UV Lamp Photocatalysis FIG. 18 shows the results of tests of utilization of the surface corona discharge reactor as compared with power consumption conventional UV lamp photocatalysis. The tests show a two fold increase in the conversion and a ten fold decrease in power consumption for the surface corona oxidation as compared to the conventional photocatalytic oxidation using a powerful UV light (250 Vs 2500 Watt per pass). The comparative study proves that the surface corona discharge based ozonation and photocatalysis has much lower power requirements and therefore is relatively inexpensive and faster.

Example 5

Liquid Phase Surface Corona Discharge Ozonation and Photooxidation for the Degradation of Methyl Tertiary Butyl Ether In this Example the liquid phase treatment of water contaminated with methyl tert-butyl ether MTBE) using a surface corona discharge reactor in accordance with the present invention was investigated. Methyl tert-butyl ether (MTBE) which has been used as oxygenate in reformulated gasoline, has been detected in leakage from under ground storage tanks and causes serious ground water contamination. The U.S. Environmental Protection Agency (USEPA), has classified MTBE as a possible human carcinogen, and has issued a drinking water advisory of 20 to 40 μg/L.

MTBE has a low Henry's Law constant and high solubility in water, so conventional volatile organic compound (VOC) contaminant treatment technologies, including air-stripping, granular activated carbon adsorption, and in-situ bioremediation are not cost effective for its removal. The development of a reliable and cost-effective method to remove MTBE at moderate or low temperature has presented a significant challenge.

Figure 19:
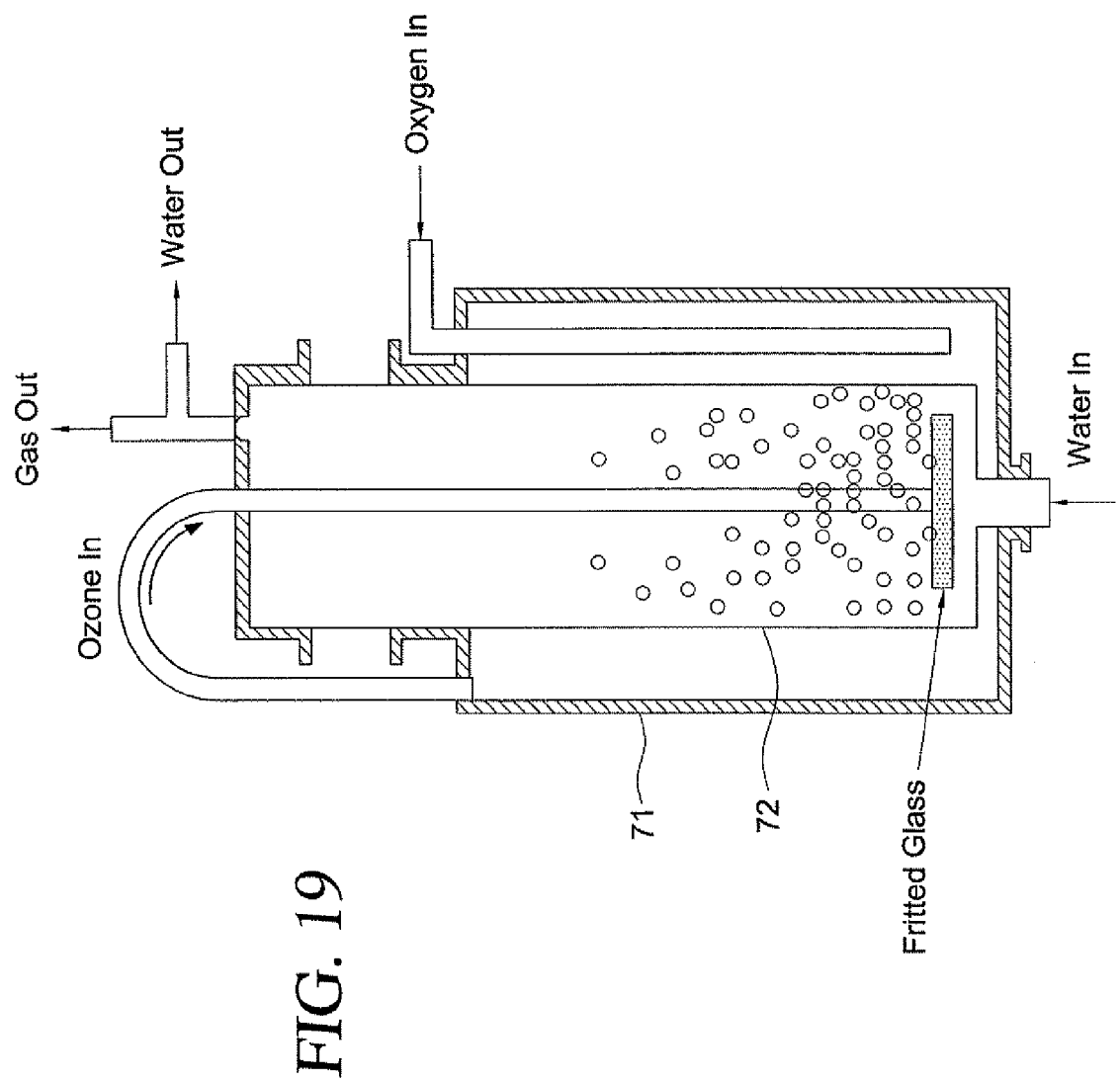
FIG. 19 is the schematic view of the combined liquid phase reactor for ozonation and photocatalytic oxidation of methyl tert-butyl ether under different conditions used in Example 5.

FIG. 19 is a cross sectional schematic diagram of the prototype surface corona discharge photocatalytic reactor used in this working example. As illustrated in FIG. 19, the reactor consisted of two concentric tubes 71,72. The outer tube 71 had embedded ceramic electrodes on its inner surface, which electrodes generate UV light. The inner tube 72 was a Pyrex tube having its interior surface coated on the inside with a nanostructured titanium dioxide film. The UV light generated by the ceramic electrodes passed through the Pyrex tube and activated the titanium dioxide film that was in contact with the MTBE contaminated water. The ozone was supplied through fritted glass at the bottom of the Pyrex tube and percolated up through the contaminated water within the reactor. This percolation maximized the contact time of the ozone gas with water, thereby increasing dissolution and the mass transfer of MTBE from the liquid to the titanium dioxide surface.

Figure 20:
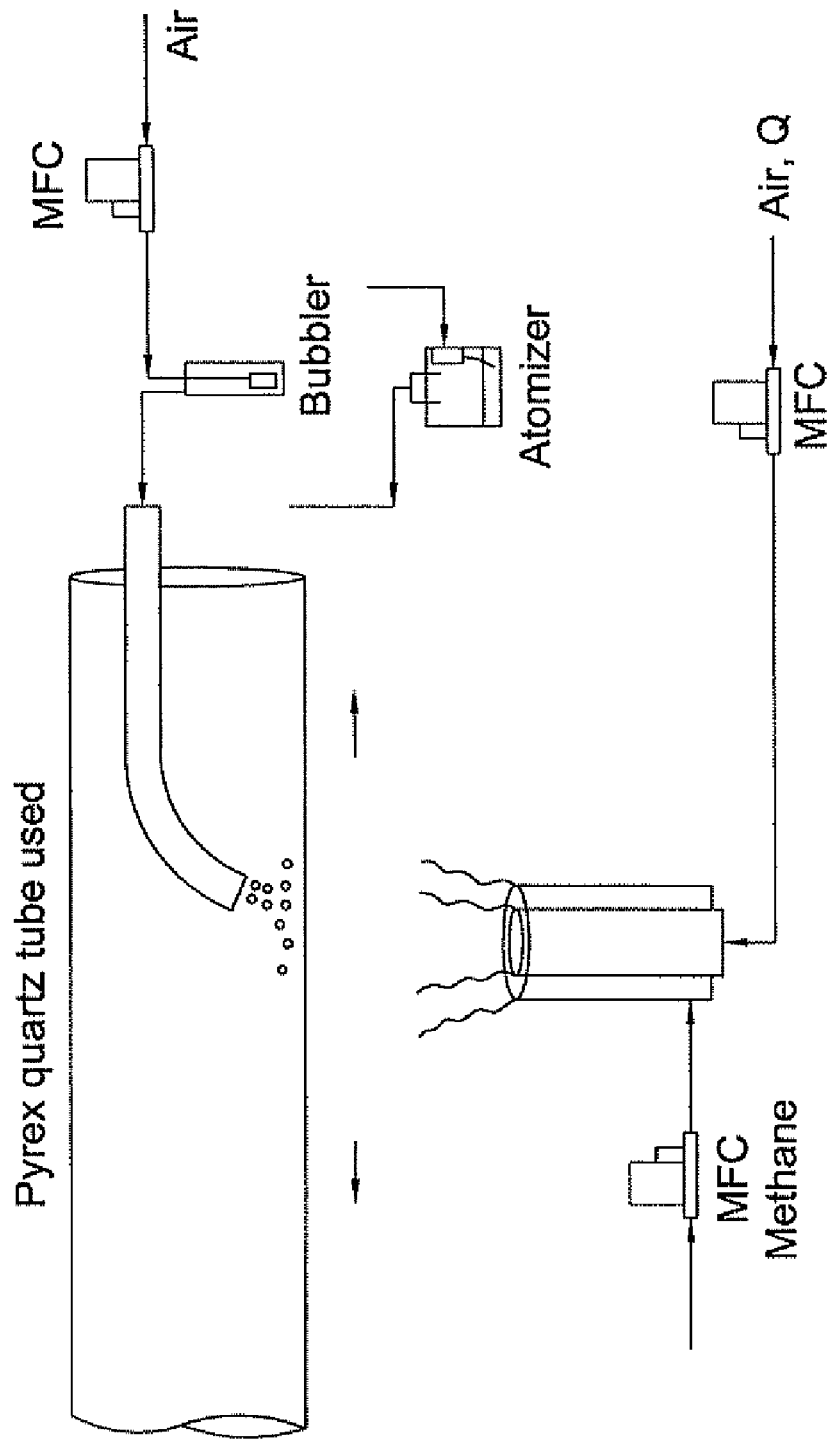
FIG. 20 is schematic view of the aerosol flame coating system used in Example 6.

FIG. 20 illustrates the flame aerosol method used to deposit a fine-grained, high-surface area TiO$_2$, inside the Pyrex tube 72 of the surface corona discharge photoreactors used in example 5 to test both ozonation and titanium dioxide photooxidation independently. The ozone concentration and UV light intensity were adjusted with a variable voltage control (variac). Varying these parameters allowed determination of the role of each advanced oxidation process in the degradation of MTBE, along with the synergistic effect of using both processes together.

X-ray diffraction was used to identify the phase compositions, the lattice parameters, and the crystallite size of TiO$_2$. Electron microscopy was used to establish the real space structures: the deposited particle sizes and morphologies. A BET surface area analyzer was used to measure specific surface areas. The intensity of the UV light generated by the embedded ceramic electrodes was measured with a radiometer/photometer with two detectors with a narrow band-pass filter for wave lengths 315 to 400 nm and 250 to 315 nm, respectively. The detector for the narrow band was placed inside the reactor (FIG. 19) with the measuring surface facing the UV generating surface and spaced therefrom by a distance of 1 cm. MTBE and intermediate byproducts were analyzed by using a gas chromatograph and a flame ionization detector. The MTBE measurement procedures are based on the Ambient Headspace Method from Agilent (Szelewaki and Quimby, 2000). Intermediate byproducts of MTBE were also identified.

Figure 21:
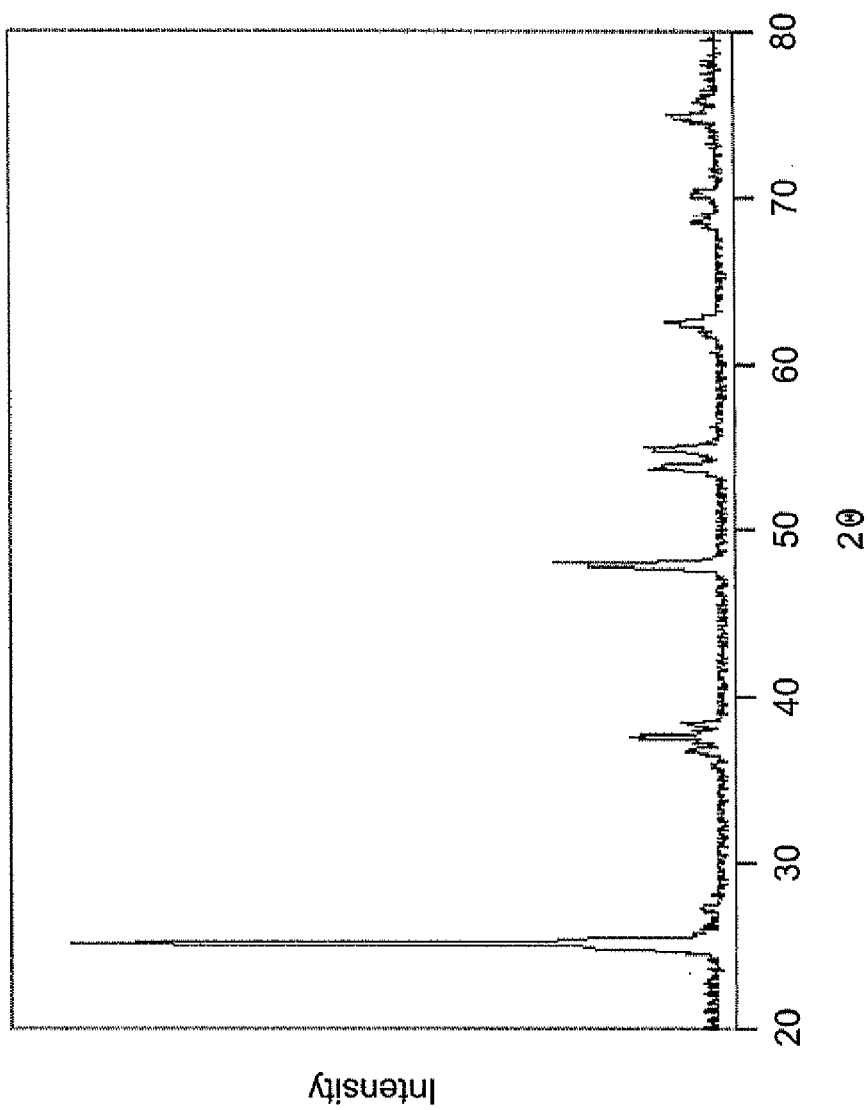
FIG. 21 is X-ray Diffraction spectrum pattern of the titanium dioxide film used in Example 5.
Figure 22A:
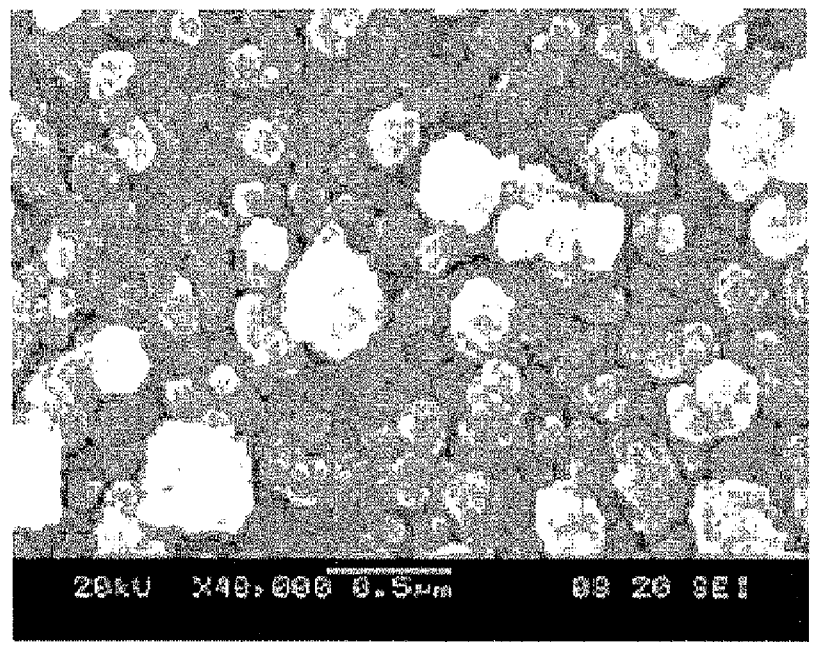
FIGS. 22A and 22B are scanning electron microscopy (SEM) images of the titanium dioxide film used in Example 5 (a)×40,000 and (b)×5000.
Figure 22B:
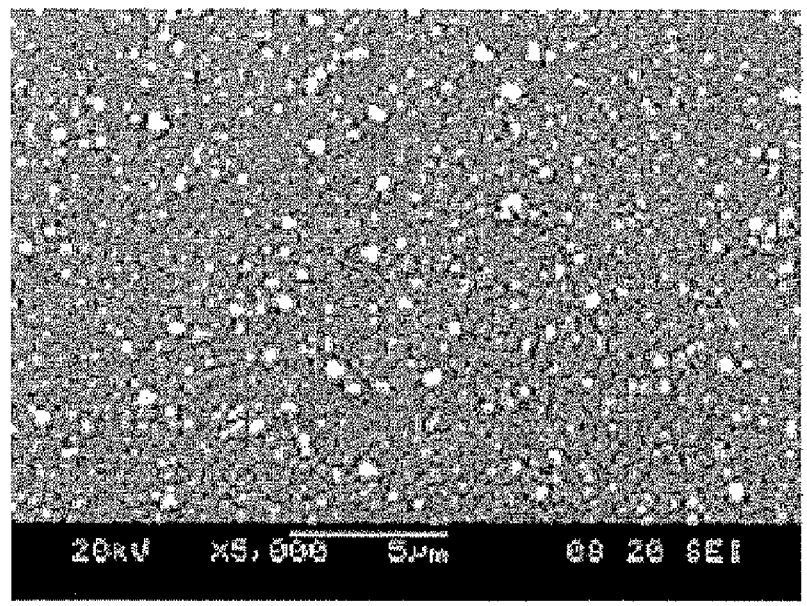

FIG. 21 is a graphical representation of the X-ray diffraction pattern of the titanium dioxide film. The phase composition was more than 98% anatase. The crystallite size, obtained by the Scherrer equation (Azaroff, 1968), was approximately 33 nm. The specific surface area, measured by BET surface area analyzer, indicated a range of 80-100 m$^2$g. SEM images of the titanium dioxide film are shown in FIGS.

22 (a) and 22 (b). The titanium dioxide film was found to have an uneven granular surface, which provides many adsorption sites for MTBE. The anatase titanium dioxide film was found to adhere very well to the Pyrex tube and was very durable throughout several runs.

Figure 23:
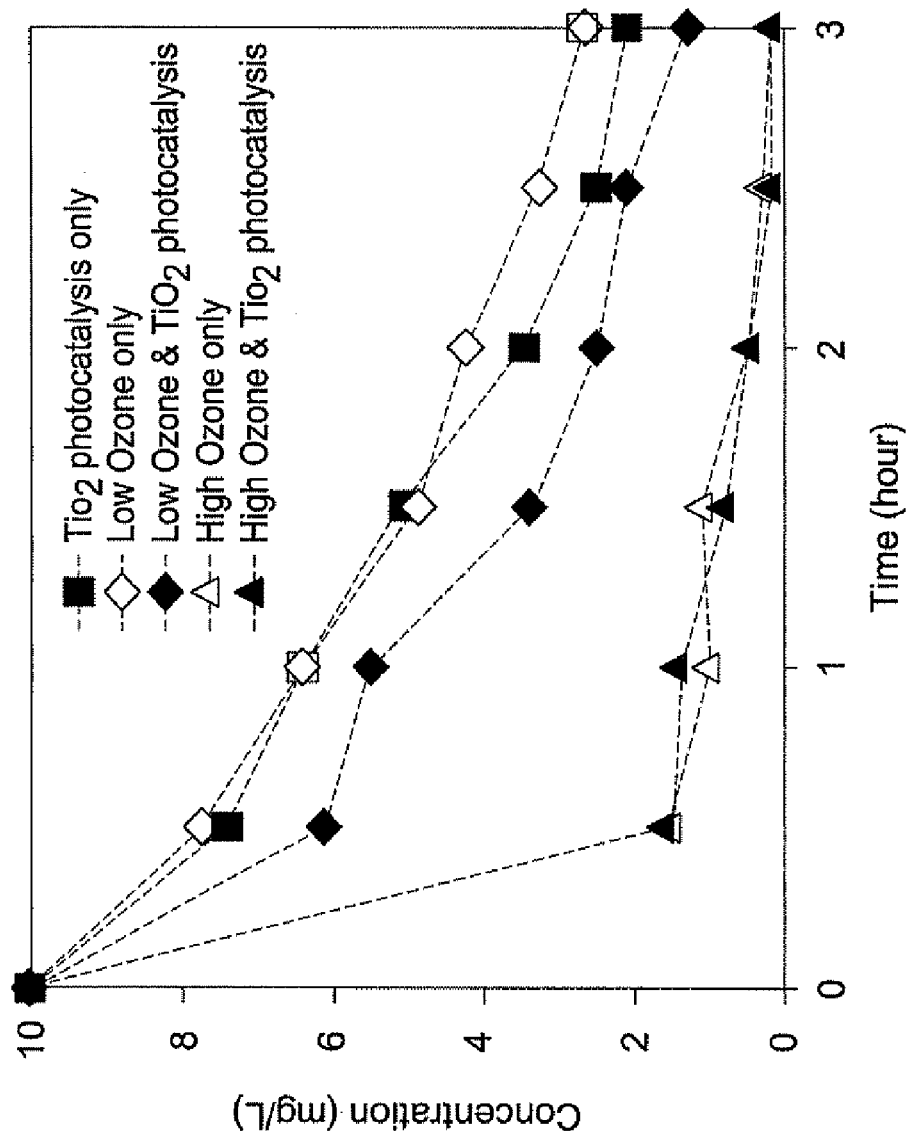
FIG. 23 is a graph of concentration of MTBE in contaminated water versus time under the different conditions used in Example 5.
Figure 24:
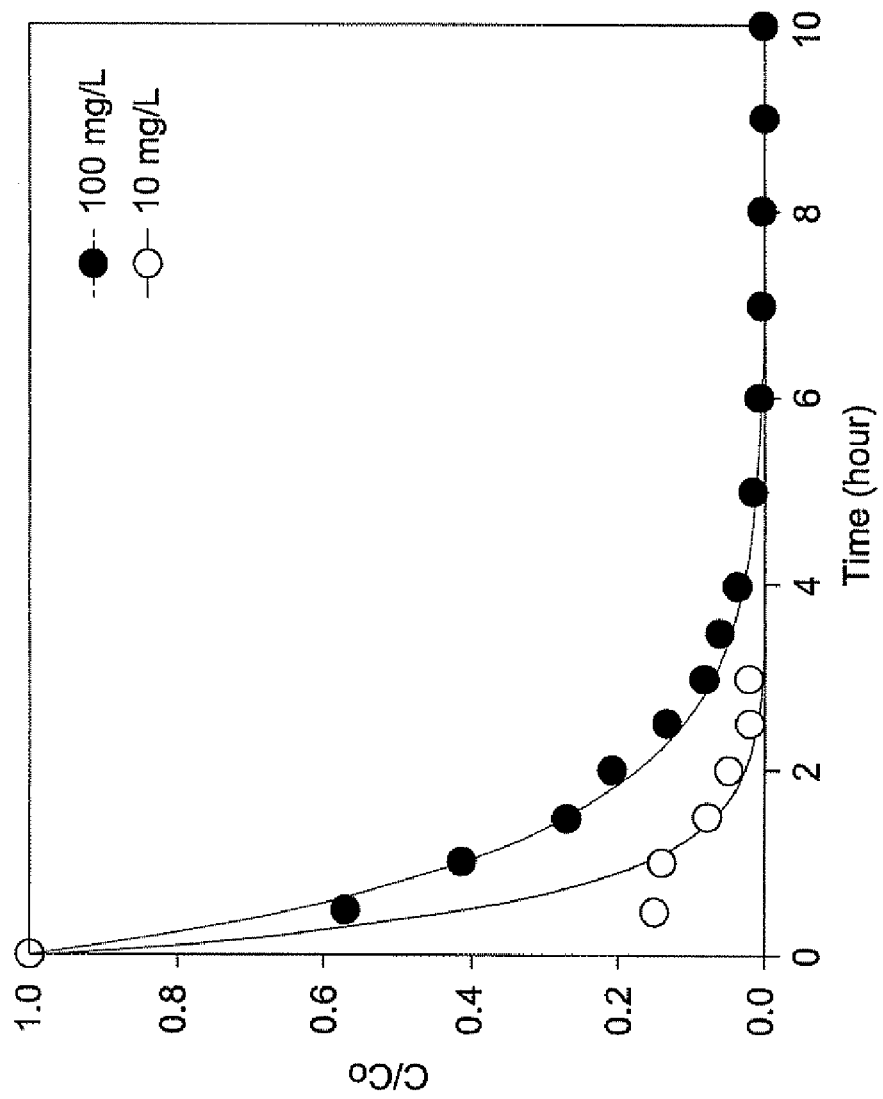
FIG. 24 is a graph showing effects of the initial concentration of MTBE on the degradation of MTBE concentration normalized to the initial concentrations using a surface corona discharge reactor in Example 5.
Figure 25:
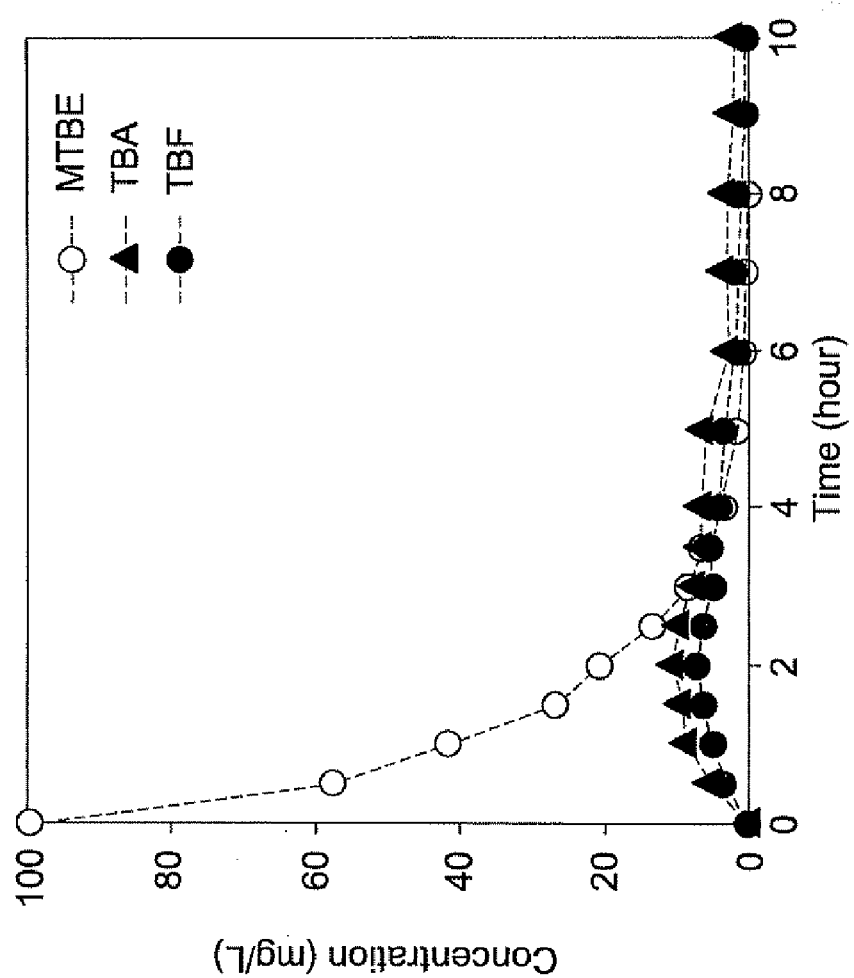
FIG. 25 is a graph of concentration of MTBE and intermediate byproducts in water versus time for an initial concentration of 100 mg/L MTBE using the surface corona discharge reactor in Example 5.

The UV light intensity measurements for the wave length ranges of 250 to 315 nm and 315 to 400 nm were 2.5 and 12 mW/cm$^2$, respectively. FIG. 23 presents the results of the experiments conducted under different conditions. The enhanced effect of titanium dioxide photocatalysis was more noticeable when the ozone concentration was low than when it was high. With a high concentration of ozone, there was no significant enhancement of MTBE degradation by the combined effects. The results with different initial concentrations of MTBE are shown in FIG. 24. Decomposition of MTBE and the formation of by-products as a function of time is illustrated in FIG. 25.

Third Embodiment of the Apparatus

Figure 26:
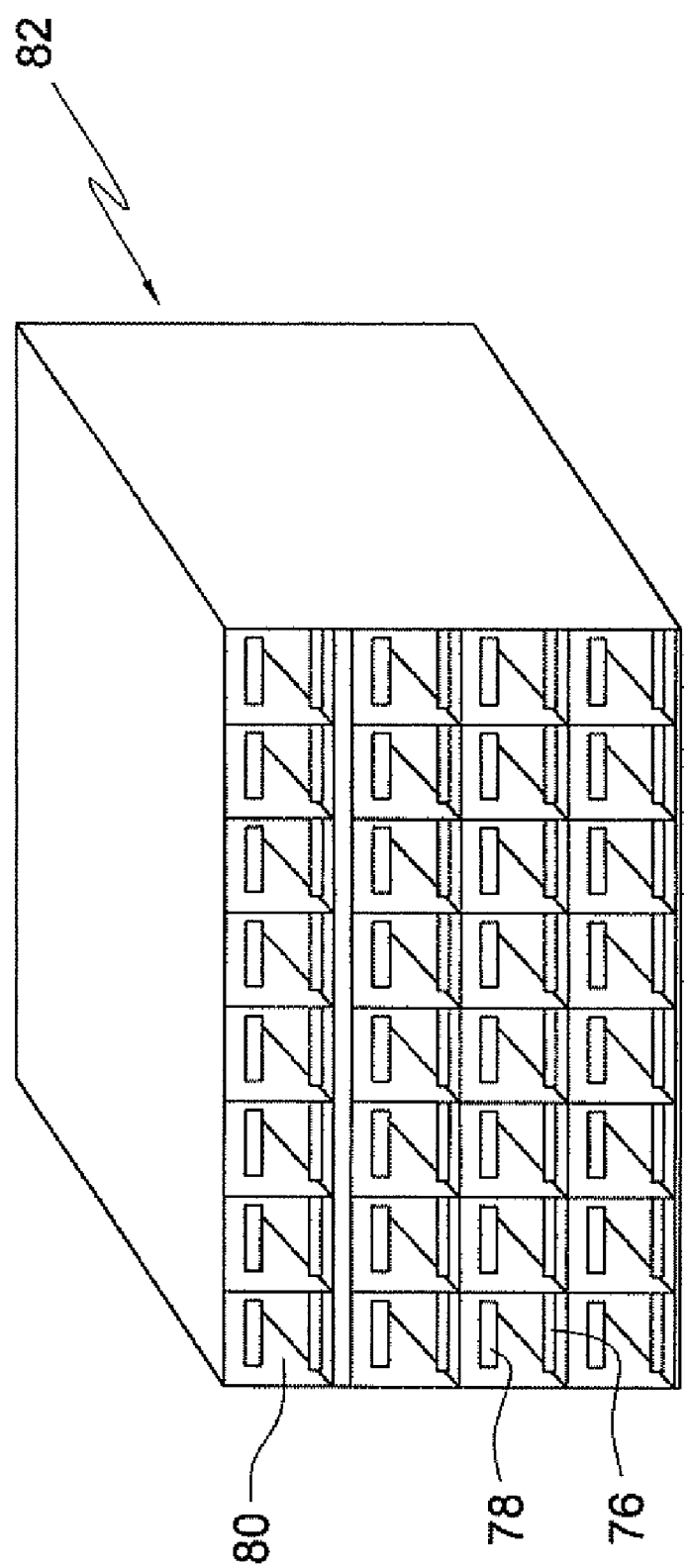
FIG. 26 is a schematic view of a third embodiment of the apparatus of the invention in the form of a multi-passage reactor.

FIG. 26 illustrates a third embodiment of an apparatus in accordance with the present invention in the form of a square lattice honeycomb reactor 82. This third embodiment has embedded ceramic electrodes 76 and titanium dioxide films 78 of 0.02 to 0.2 μm thickness and extending parallel to the electrodes through the linear flow channels 80. The honeycomb configuration provides a high surface area and compact reactor that does not need an external ultraviolet lamp, such as medium pressure mercury lamp, as a light source. The external design of the honeycomb systems with a surface corona electrode 76 in each channel is shown in FIG. 26. The honeycomb reactor has a high surface area per unit volume of the reactor and is suitable for gaseous feedstreams that contain significant amounts of particulate matter, as dust tends to clog a catalyst bed. To process feedstreams of this type, parallel-plate reactors (monoliths) are commonly used. FIG. 26 is a schematic diagram of such a monolithic reactor.

Figure 27:
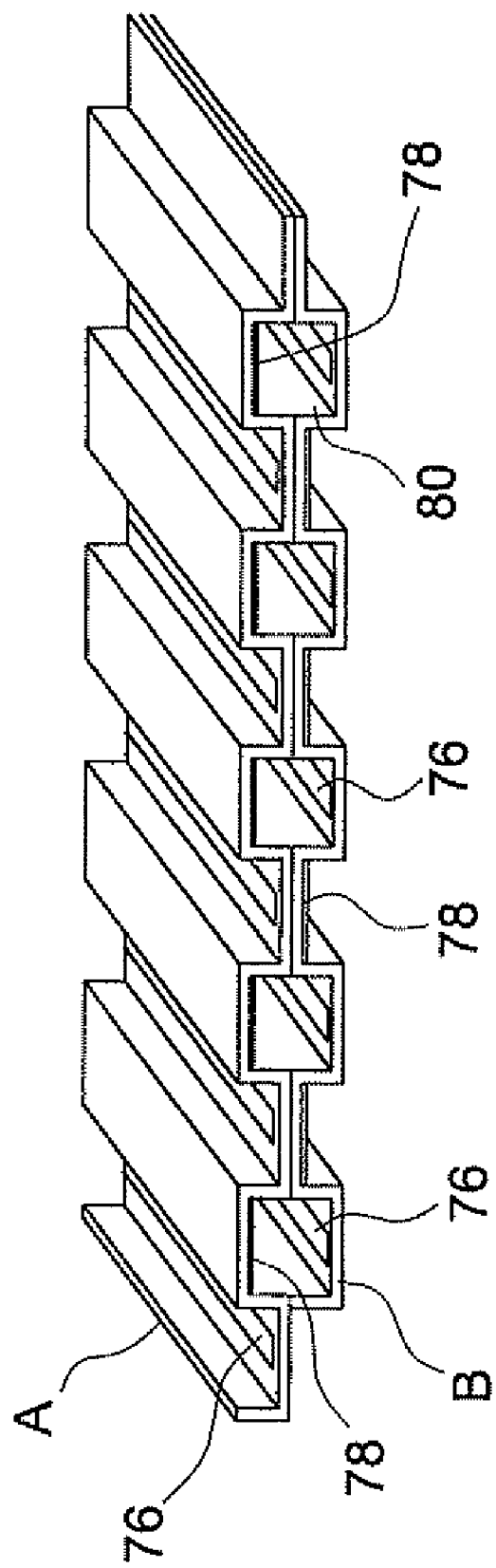
FIG. 27 is a perspective view of the multi-channel embedded surface corona reactor of the third embodiment.

The "honeycomb reactor" 82 may be formed of stacked corrugated plates with alternating grooves and raises, two of which (A,B) are shown in FIG. 27. Note in FIG. 27 that plates A and B have their grooves in a facing relationship thereby forming the linear flow channels therebetween.

Although the present invention has been described above with reference to specific embodiments, the present invention is not limited to those specific embodiments described above, but various modifications are possible without departing from the spirit and scope of the invention.

What is claimed is:

1. A method for treatment of a fluid by process comprising:
supplying power to at least one electrode embedded in a first surface to generate a surface corona and to emit ultra-violet light, the first surface facing and spaced a second surface to define a flow path between and in parallel with the first and second surfaces, the second surface containing nanostructured titanium dioxide;
contacting oxygen with the surface corona to convert the oxygen into ozone;
introducing the fluid into the flow path causing the fluid to flow in parallel with the first and second surfaces and to come into contact with the ozone for oxidation of the fluid;
receiving the emitted ultraviolet light at a second surface facing the first surface, whereby the nanostructured titanium is activated;
contacting the fluid with the activated nanostructured titanium dioxide for photocatalytic oxidation of the fluid.

2. The method of claim 1 wherein the photocatalysis is conducted without use of an ultraviolet lamp.

3. The method of claim 1 wherein the nanostructured titanium dioxide is formed by a flame aerosol method.

4. The method of claim 1 wherein the fluid contains at least one organic compound as a contaminant and the contaminant is oxidized by the contact with ozone and photocatalysis.

5. The method of claim 4 wherein the fluid is air.

6. The method of claim 4 wherein the fluid is water.

7. The method of claim 1 wherein the fluid is at least one hydrocarbon and the contact with ozone and photocatalysis converts the hydrocarbon to at least one of an alcohol and a ketone.

8. The method of claim 1 wherein the fluid includes at least one alcohol and the contact with ozone and photocatalysis converts the alcohol into at least one ketone.

9. A method according to claim 1 wherein the ultraviolet light emitted by the surface corona electrodes has major peaks at 315 nm, 338 nm, 358 nm and 381 nm and wherein the measured total light intensity ranges from 2 to 50 mW/cm$^2$.

10. The method of claim 1 further comprising controlling the amount of ozone generated by controlling the flow rate of the oxygen entering into contact with the surface corona.

11. The method of claim 1 further comprising controlling the amount of ultraviolet radiation emitted from the embedded electrodes and the subsequent activation of nanostructured titanium dioxide by varying input of power into the surface corona electrodes.

12. The method of claim 1 wherein:
the first surface is a surface of a first tubular wall element having at least one electrode embedded therein, the at least one embedded electrode generating a surface corona and ultraviolet light;
the second surface is an interior cylindrical surface of a second tubular wall element formed of a material transparent to ultraviolet light, wherein the second tubular wall element is concentric with and surrounded by the first tubular wall element to form an outer annular space between the first and second surfaces, the outer annular space being provided with a gas inlet and a gas outlet respectively provided at a lower end and an upper end, whereby ultraviolet light emitted at the first surface passes through the UV transparent second tubular wall element and is received by the nanostructured titanium dioxide at the second surface and the nanostructured titanium dioxide is thereby activated;
a central fluid feed tube is concentric with the first and second tubular wall elements and surrounds a central flow passage, whereby an inner annular space is defined between the central fluid feed tube and the second tubular wall element, and the central fluid feed tube has an open lower end axially spaced from a lower end of the second tubular wall element; and
a housing contains the first and second wall elements and comprises top and bottom walls, with the lower end of the inner annular space being closed by a bottom wall; and
wherein the method further comprises:
introducing the fluid to be subjected to ozonation and photocatalytic oxidation into an upper end of the central feed tube, for flow downward through the central fluid feed tube and out the lower end of the central fluid feed tube, the flow the fluid reversing direction at the lower end of the central feed tube and flowing upward through the inner annular space in contact with the second surface while subjected to the photocatalytic oxidation;
introducing an oxygen-containing gas into the gas inlet for flow upwardly through the outer annular space and through a surface corona generated at the first surface, whereby the oxygen-containing gas is subjected to the ozonation to form an ozone-containing gas which exits through the gas outlet; and mixing the ozone-containing gas with the fluid upstream of entry of the fluid into the upper end of the central feed tube.

13. The method of claim 12 wherein a plurality of elongated surface corona electrodes are embedded in the first surface, evenly spaced around the circumference of the first tubular wall element with their longest dimension oriented in parallel with a central axis of the first tubular wall element.

* * * * *